(12) United States Patent
A K

(10) Patent No.: US 12,705,754 B2
(45) Date of Patent: Aug. 11, 2026

(54) METHOD, DEVICE, AND COMPUTER PROGRAM FOR DETECTING BOUNDARY OF OBJECT IN IMAGE

(71) Applicant: SAMSUNG ELECTRONICS CO., LTD., Suwon-si (KR)

(72) Inventor: Mahesh Babu A K, Noida (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 431 days.

(21) Appl. No.: 18/202,633

(22) Filed: May 26, 2023

(65) Prior Publication Data

US 2023/0306609 A1 Sep. 28, 2023

Related U.S. Application Data

(63) Continuation of application No. PCT/KR2021/018797, filed on Dec. 10, 2021.

(30) Foreign Application Priority Data

Dec. 10, 2020 (IN) ............................ 202011053808

(51) Int. Cl.
*G06K 9/00* (2022.01)
*G06T 7/13* (2017.01)
*G06T 7/162* (2017.01)

(52) U.S. Cl.
CPC ................ *G06T 7/13* (2017.01); *G06T 7/162* (2017.01)

(58) Field of Classification Search
CPC .. G06T 7/13; G06T 7/162; G06T 7/12; G06T 7/181; G06T 2207/10024; G06T 2207/30196; G06V 10/469; G06V 40/20
See application file for complete search history.

(56) References Cited

U.S. PATENT DOCUMENTS 5,119,439 A * 6/1992 Osawa ................ G06V 10/457 382/199
5,621,819 A * 4/1997 Hozumi .................... G06T 9/20 375/E7.081

(Continued)

FOREIGN PATENT DOCUMENTS

CN 1797030 A 7/2006
CN 107194938 A 9/2017

(Continued)

OTHER PUBLICATIONS

"Boundary tracing", Wikipedia, Sep. 2022, 3 pages total.

(Continued)

*Primary Examiner* — Shervin K Nakhjavan
(74) *Attorney, Agent, or Firm* — Sughrue Mion, PLLC

(57) ABSTRACT

The present disclosure provides a method of enabling image-based classification in real-time scenarios such as person presence identification, image-based gesture-recognition, real-time object detection, character recognition etc. The present disclosure provides a method and system of contour detection as part of data pre-processing pipeline for training and real-time inferencing of image-based multi-classifier using Machine Learning. A direction-based contour detection method is implemented as part of data pre-processing pipeline for real-time image-based multi-classifier/inferencing using ML algorithms. A parallelized contour detection method is implemented to reduce input feature set, reduce training and prediction time.

15 Claims, 32 Drawing Sheets

(56) References Cited

U.S. PATENT DOCUMENTS

| | | | | |
|---|---|---|---|---|
| 5,778,105 | A * | 7/1998 | Shively | G06T 7/12 382/269 |
| 5,825,922 | A * | 10/1998 | Pearson | G06T 7/12 382/209 |
| 6,268,933 | B1 * | 7/2001 | Kim | G06T 5/73 358/1.9 |
| 6,356,657 | B1 * | 3/2002 | Takaoka | G06T 7/60 382/173 |
| 6,674,904 | B1 * | 1/2004 | McQueen | G06T 7/13 382/199 |
| 7,313,254 | B2 | 12/2007 | Lee et al. | |
| 7,805,006 | B2 | 9/2010 | Katsuyama et al. | |
| 7,916,912 | B2 * | 3/2011 | Abramov | G06T 7/12 382/128 |
| 7,973,986 | B2 * | 7/2011 | Ishiguro | G06T 7/13 358/463 |
| 8,675,059 | B2 * | 3/2014 | Johnson | G06V 20/40 340/541 |
| 8,786,903 | B2 | 7/2014 | Suzuki | |
| 9,164,588 | B1 | 10/2015 | Johnson et al. | |
| 10,395,364 | B2 * | 8/2019 | Hamada | G06T 7/13 |
| 10,510,148 | B2 * | 12/2019 | Qiu | G06V 10/44 |
| 10,997,743 | B2 * | 5/2021 | Ikeda | G06T 7/13 |
| 11,216,925 | B2 | 1/2022 | Zhang et al. | |
| 11,336,906 | B2 | 5/2022 | Xu | |
| 12,382,064 | B2 * | 8/2025 | Kirchhoffer | H04N 19/51 |
| 2003/0174890 | A1 | 9/2003 | Yamauchi | |
| 2007/0098264 | A1 | 5/2007 | Van Lier et al. | |
| 2012/0219227 | A1 * | 8/2012 | Osako | G06T 7/136 382/199 |
| 2012/0275701 | A1 * | 11/2012 | Park | G06T 7/11 382/173 |
| 2013/0322771 | A1 | 12/2013 | Poyil et al. | |
| 2015/0046886 | A1 | 2/2015 | Goel et al. | |
| 2018/0276837 | A1 * | 9/2018 | Amano | G06V 20/58 |
| 2018/0322656 | A1 | 11/2018 | Dworakowski et al. | |
| 2019/0102885 | A1 | 4/2019 | Yamaguchi | |
| 2019/0287258 | A1 | 9/2019 | Mano et al. | |
| 2021/0035318 | A1 * | 2/2021 | Nakagawa | G06T 7/74 |
| 2021/0334998 | A1 * | 10/2021 | Chu | G06T 7/187 |
| 2022/0215557 | A1 | 7/2022 | Xu et al. | |

FOREIGN PATENT DOCUMENTS

| | | | | |
|---|---|---|---|---|
| CN | 110428434 | A * | 11/2019 | G06T 7/13 |
| KR | 10-2004-0035981 | A | 4/2004 | |
| KR | 10-0568531 | B1 | 4/2006 | |
| KR | 10-2006-0100376 | A | 9/2006 | |
| KR | 101167976 | B1 * | 7/2012 | G06T 7/11 |
| KR | 10-1528604 | B1 | 6/2015 | |
| KR | 10-2015-0103902 | A | 9/2015 | |
| KR | 10-1911912 | B1 | 10/2018 | |
| WO | 2017/129573 | A1 | 8/2017 | |
| WO | 2020/228187 | A1 | 11/2020 | |
| WO | WO-2021174506 | A1 * | 9/2021 | G06T 7/13 |

OTHER PUBLICATIONS

Communication dated Jul. 6, 2022 issued by the Indian Patent Office in counterpart Indian Application No. 202011053808.

S.P.Maniraj et al., "Object Boundary Detection using Neural Network in Deep Learning", International Journal of Engineering and Advanced Technology (IJEAT), vol. 9, Issue 1, Oct. 2019, 5 pages total.

Piotr Dollár et al., "Supervised Learning of Edges and Object Boundaries", Proceedings of the 2006 IEEE Computer Society Conference on Computer Vision and Pattern Recognition (CVPR'06), Jun. 2006, 8 pages total.

Communication dated Mar. 21, 2022 issued by the International Searching Authority in counterpart Application No. PCT/KR2021/018797 (PCT/ISA/220, PCT/ISA/210, and PCT/ISA/237).

Jonghoon Seo et al., "Fast Contour-Tracing Algorithm Based on a Pixel-Following Method for Image Sensors", Sensors, vol. 16, Issue. 3, 353, Mar. 9, 2016, 56 pages total.

Seokmok Park et al., "A Novel Comer Detector using a Non-cornerness Measure", IEIE Transactions on Smart Processing and Computing, vol. 6, No. 4, Aug. 30, 2017, 10 pages total.

Vijay Sukhadeve, "uWave: Accelerometer-based Personalized Gesture Recognition and Its Applications", Dec. 2009, 23 pages total.

"Image Recognition Market by Technology (Digital Image Processing, Facial Recognition, Pattern Recognition), Component (Hardware, Software, and Services), Deployment Mode (On-premises & Cloud), Application, Vertical, and Region—Global Forecast to 2025", Image Recognition Market, Jan. 2021, 4 pages total.

* cited by examiner

Anti-clockwise 8 7 6

NW [-1,-1] | N [-1,0] | NW [-1,1]

1 W [0,-1] | S [0,0] | E [0,1] 5

SW [1,1] | S [1,0] | SE [1,1]

2 3 4

Clockwise

1 Steps
1+2=7
Steps
1+2+4=7
Steps
Total Number of Steps involved until tracing this boundary pixel
Sequence number of boundary pixels traced
Number of Steps to Detect this boundary Pixel 1+2+4+6
=13 Steps
1+2+4+6
+4=17
Steps
1+2+4+6
+4+4=21
Steps
Total Number of Steps involved until tracing this boundary pixel
Sequence number of boundary pixeis traced
Number of Steps to Detect this boundary Pixel

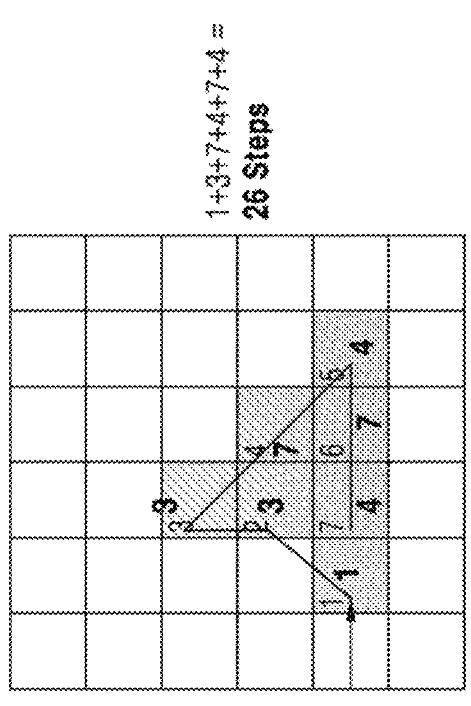
FIG. 6B
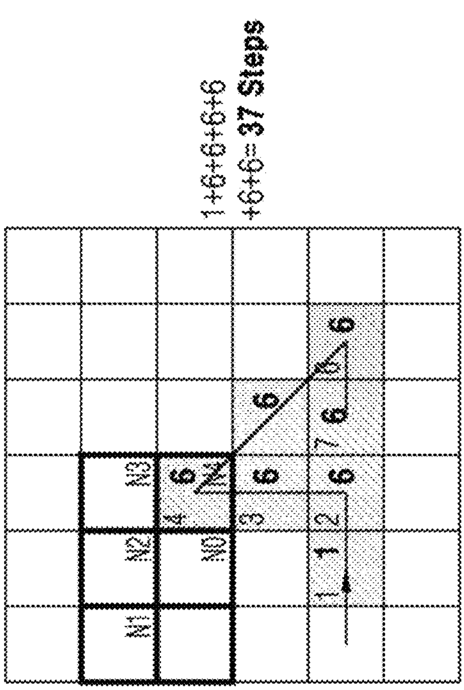

Number of pixels
detected = 8
1+3+6+5+5+5+5+5
= 35 Steps
X ← Inner corner pixels are not detected

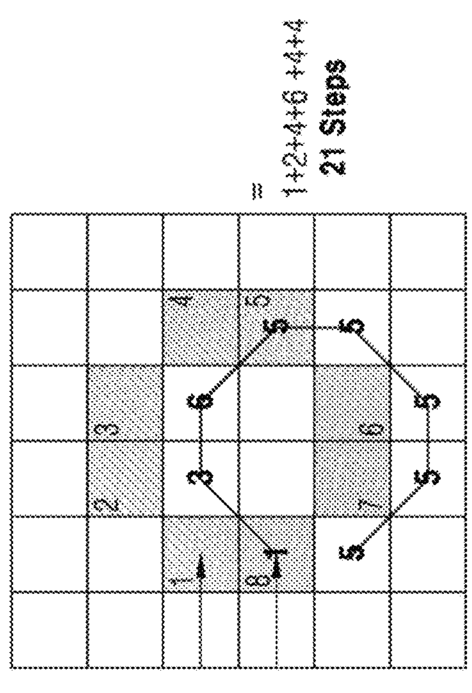
FIG. 7B
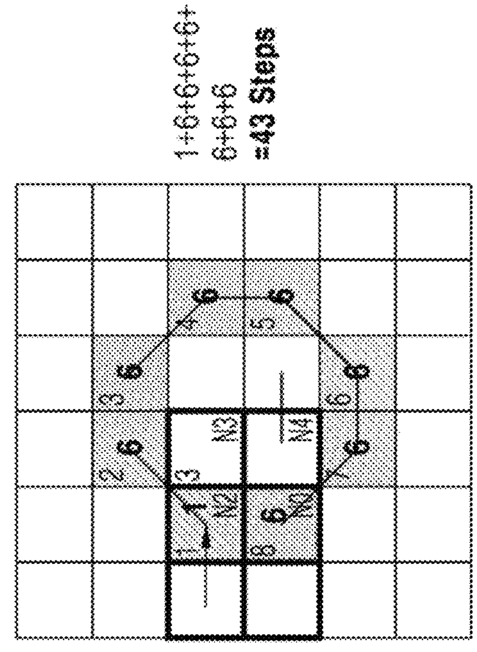

FIG. 9A

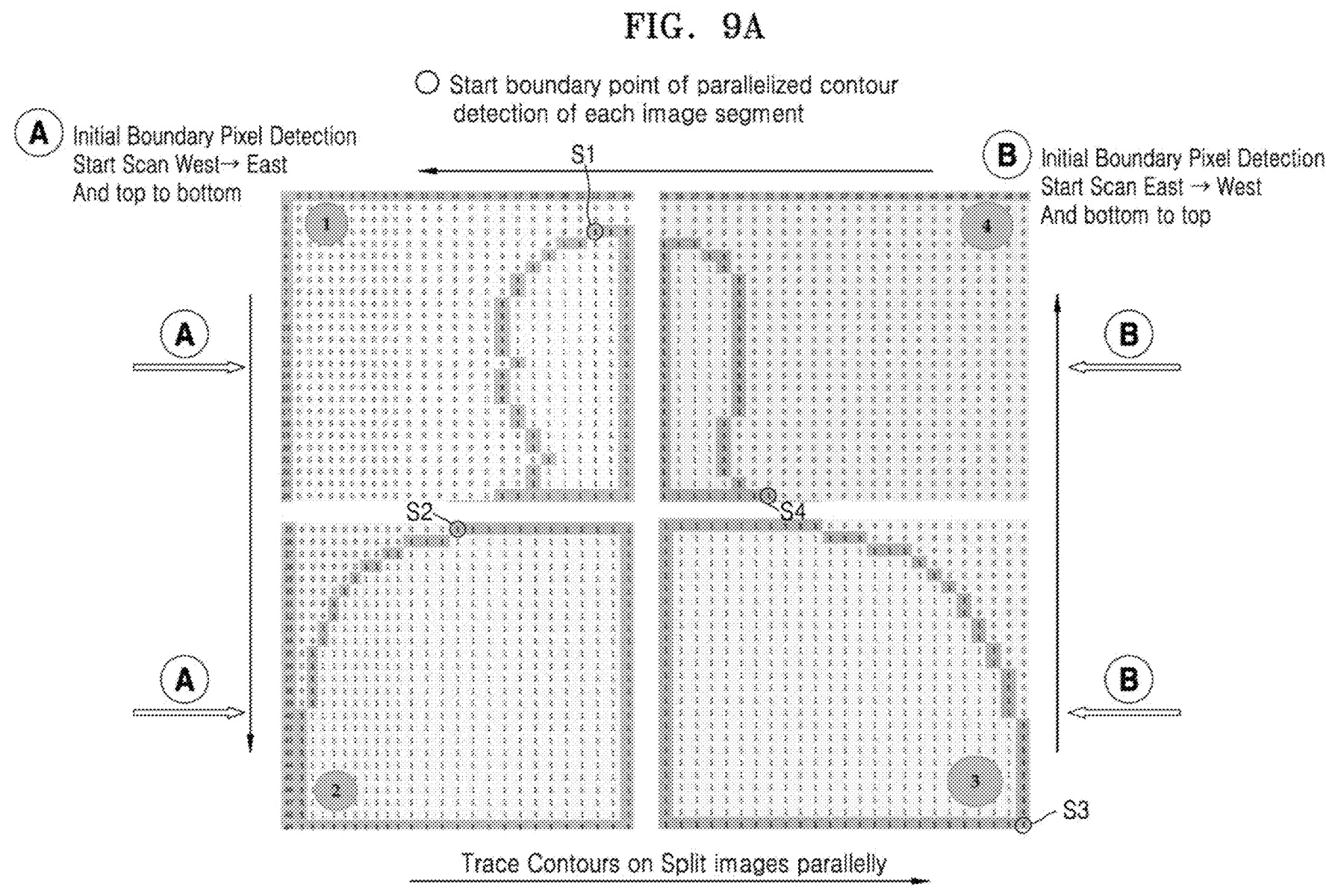

○ Start boundary point of parallelized contour detection of each image segment

A Initial Boundary Pixel Detection
Start Scan West→ East
And top to bottom

B Initial Boundary Pixel Detection
Start Scan East → West
And bottom to top

S1
S2
S3
S4
A
A
B
B

Trace Contours on Split images parallelly

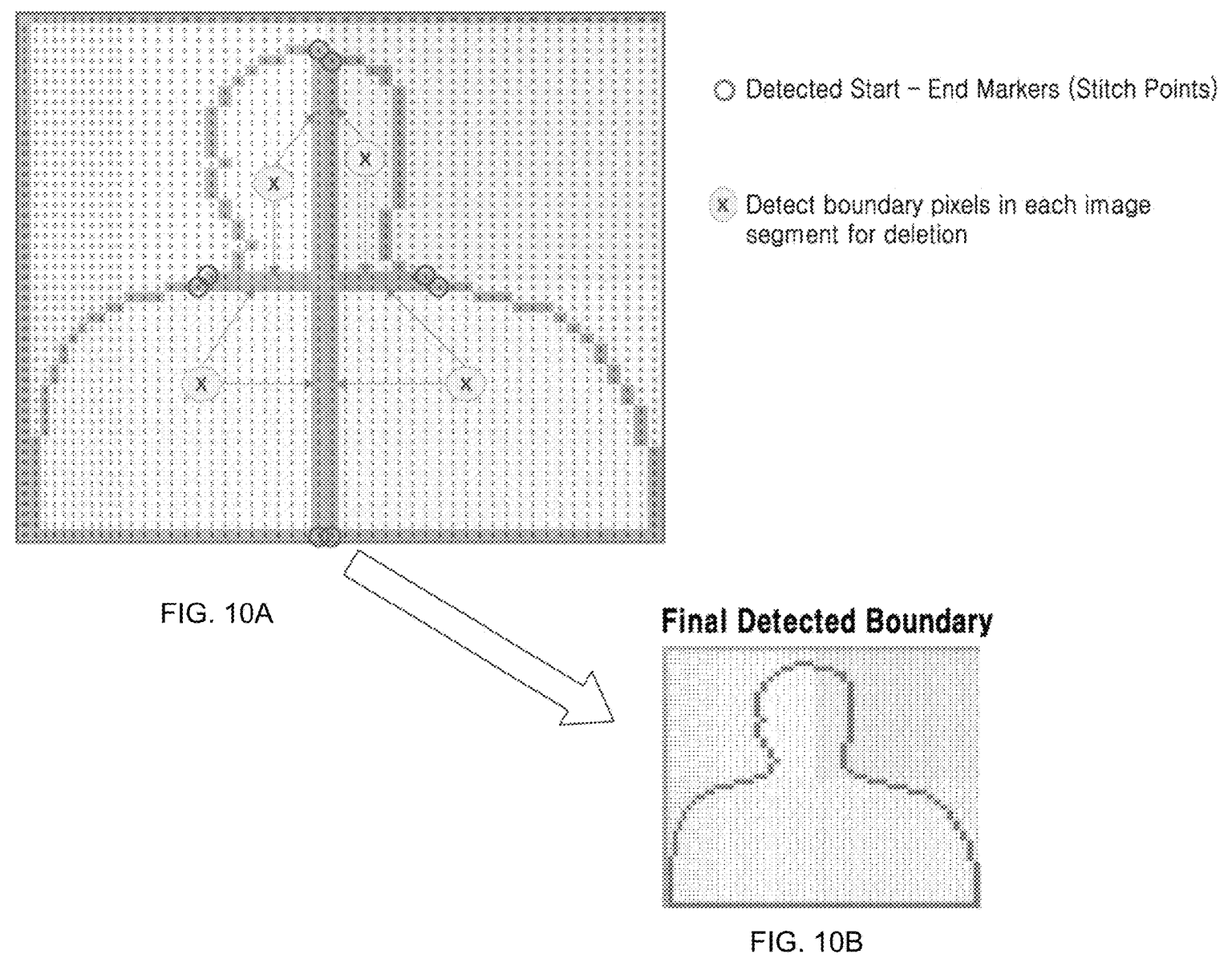

Detected Start – End Markers (Stitch Points)

Detect boundary pixels in each image segment for deletion

FIG. 10A

Final Detected Boundary

FIG. 10B

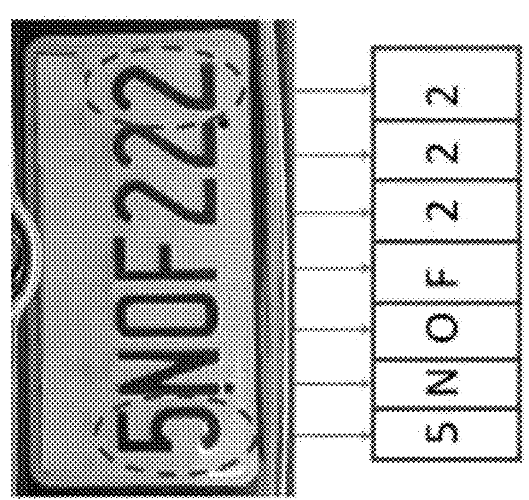
FIG. 13B
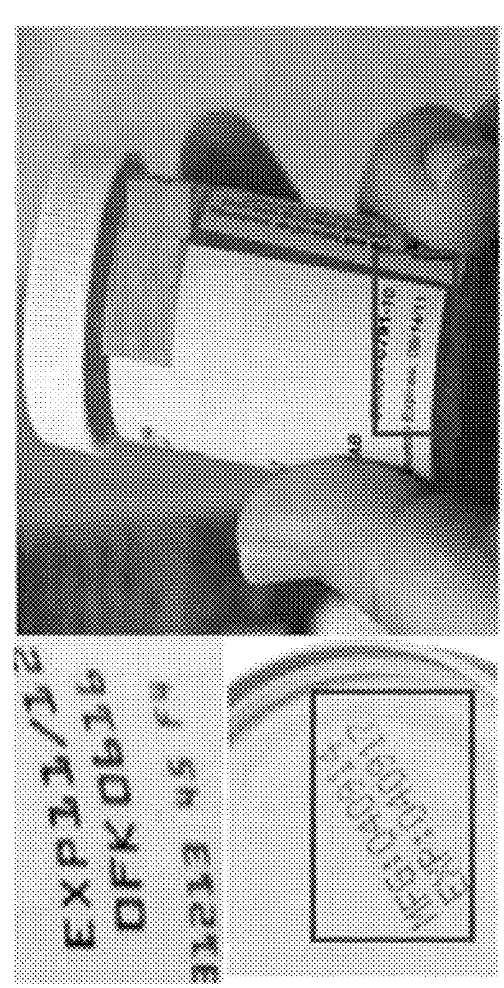

METHOD, DEVICE, AND COMPUTER PROGRAM FOR DETECTING BOUNDARY OF OBJECT IN IMAGE

CROSS REFERENCES TO RELATED APPLICATIONS

The present application is a bypass continuation of International Application No. PCT/KR2021/018797, filed on Dec. 10, 2021, in the Korean Intellectual Property Office, which claims priority from Indian Patent Application No. 202011053808, filed on Dec. 10, 2020, in the Indian Patent Office, the disclosures of which are incorporated herein in their entireties.

FIELD

The present disclosure relates to processing an image. More particularly, the disclosure relates to detecting a boundary in an image.

BACKGROUND

An artificial intelligence (AI) system may refer to a computer system that enables machines to become smart by learning and making decisions on their own, compared to an existing rule-based smart system. The AI system may improve its recognition rates and is capable of understanding a user's preferences more accurately through experience. Thus, existing rule-based smart systems are increasingly being replaced by deep learning-based AI systems.

AI technology may include machine learning (deep learning) and element technologies using the machine learning. Machine learning may refer to an algorithmic technique for autonomously classifying/learning features of input data, and element technologies are technologies for simulating functions of a human brain such as cognition and decision-making using machine learning algorithms and include technical fields such as linguistic understanding, visual understanding, reasoning/prediction, knowledge representation, motion control, etc.

Various technical fields to which AI technology may be applied are, for example, as follows. Linguistic understanding may refer to a technology for recognizing human language/characters for application/processing and includes natural language processing, machine translation, a dialog system, question answering, speech recognition/synthesis, etc. Visual understanding may refer to a technology for recognizing and processing an object, in the same way as performed by a human visual system, and includes object recognition, object tracking, image retrieval, person recognition, scene understanding, spatial understanding, image enhancement, etc. Reasoning/prediction may refer to a technology for judging information and logically inferring and predicting new information and includes knowledge/probability-based interference, optimization prediction, preference-based planning, recommendations, etc. Knowledge representation may refer to a technology for automatically processing information about human experience as knowledge data and includes knowledge construction (data generation/classification), knowledge management (data utilization), etc. Motion control may refer to a technology for controlling autonomous driving of a vehicle and motion of a robot and includes movement control (navigation, collision avoidance, and travelling), manipulation control (action control), etc.

Image-based classification (e.g. Multi-image classifiers) usually requires large input feature sets, which usually leads to greater time consumption during training and inferencing stages of neural-networks. Furthermore, large input-feature sets requires considerable time for pre-processing data.

Specifically, neural networks such as convolution neural networks (CNN) have well-defined multi-layers architecture which is useful for complex image-classification. Image multi-classifiers using the neural networks have a well-defined deep architecture which processes images using various convolutions and pooling. Yet, deep learning architectures are known to exhibit time-inefficient processing. As the models pertaining to the neural networks are bulky, longer training time and prediction (inferencing) time is required. Furthermore, privacy and security of users may be compromised because the whole image is processed. Neural Networks' computation complexity drastically increases with increase of complexity of input feature sets while redundant connections which do not contribute to the final output prediction may be processed.

Simple image-based classification such as identifying presence of a person, posture, or gesture inputs like hand gesture, person presence detection, character recognition etc. may be performed in real-time. A complex deep neural network such as CNN for accurate prediction may be not used for the simple image multi-classification, because the complex deep neural networks have disadvantage to real-time detection due to the large input feature sets. Deep learning architectures such as CNN are found to be too complex and time-consuming, especially for real-time classification, which makes resource-constrained edge devices such as a mobile phone or microcontroller difficult to perform real-time inferencing through neural network architectures.

Decision tree-based algorithms do not exhibit complexity or redundancy that the deep learning architectures exhibit, so they may be used for simple image classification. Yet, while the decision tree-based algorithms may perform prediction much faster with smaller model size, they may lack the accuracy exhibited by the deep learning architectures.

SUMMARY

Deep learning architectures exhibit more complexity or redundancy but more accuracy than decision tree-based algorithms. According to an embodiment of the disclosure, in order to make the deep learning architectures more time-efficient, input feature set reduction methods are provided. The input feature set reduction methods may be used to apply neural network architectures to image-based classification or prediction.

The present disclosure provides a method for detecting boundary of an object in an image based on contour-detection, and the method may include:

a) receiving the image for detection of the boundary of the object and subjecting the image to pre-processing as a primary image to result into a secondary image having a lower number of color values than the primary image, the color values including at least one zero color value and at least one non-zero color value;

b) initiating scanning of the secondary image based on determining one or more of:

a start-pixel in the secondary image having the zero color value and located outside the boundary of the object within the secondary image; and a current direction of scanning directed to the boundary within the secondary image, said current direction initiating from a default direction and updating iteratively;

c) determining a start boundary pixel having the non-zero color value based on scanning the secondary image in the current direction upon initiating from the start pixel;

d) determining a next boundary pixel having the non-zero color value in neighborhood of a current boundary pixel defined by either the start boundary pixel or a next boundary pixel determined subsequent to the start boundary pixel, said determination of the next boundary pixel based on scanning the secondary-image through the steps of:

i) updating the current direction by reversing the current direction and rotating the reversed current direction anticlockwise or clockwise to reach a diagonally adjacent pixel in the neighborhood of the current boundary pixel;

ii) initiating scanning from the diagonally adjacent pixel, in anti-clockwise or clockwise order to locate presence of at least one pixel having the non-zero color value as the next boundary pixel in the neighborhood of the current boundary pixel, the next boundary pixel being linearly or diagonally adjacent to the current boundary pixel in the neighborhood;

(iii) based on locating the next boundary pixel, resuming scanning from the next boundary pixel as the current boundary pixel and re-executing steps (i) and (ii) in respect of the updated direction to determine a further next boundary pixel; and iv) based on ascertaining an absence of the at least one pixel having the non-zero color value in the neighborhood of the next boundary pixel and excluding the located pixels having non-zero value, resuming scanning of the secondary image in the current direction from the current boundary pixel and re-executing steps (i) and (ii) in respect of the updated direction to determine the further next boundary pixel;

e) identifying one or more further next boundary pixels based on iteratively scanning the secondary image through executing step d) till attainment of a complete contour of the object in the secondary image; and f) detecting the boundary of the object within the secondary image based on one or more contours traced through the start boundary pixel and the one or more next boundary pixels in steps c) to e).

According to an embodiment, the preprocessing includes:

analyzing the primary image as one or more of a color or grayscale image; and transforming the primary image into a binary image exhibiting two color values as zero and non-zero.

According to an embodiment, the preprocessing includes resizing the primary image to reduce an input feature set associated with the primary image and thereafter transforming the resized primary image into the binary image.

According to an embodiment, the current direction defined by default direction of scanning the secondary image directed to the boundary of the object corresponds to at least one of: I) left to right direction, II) right to left direction, III) upward direction, and IV) downward direction within the secondary image.

According to an embodiment, attaining the complete contour of the object in the secondary image includes one or more of:

detecting the next boundary pixel or the further next boundary pixel as identical to the start boundary pixel or the start point; and achieving a pixel end condition based on reaching an end portion of the secondary image, the end portion of the secondary image defined by a condition as one of:

prohibiting a forward scanning of the secondary image without backtracing; and permitting a forward scanning of the secondary image by retracing.

According to an embodiment, the scanning within the neighborhood of the start boundary pixel corresponds to scanning of about 8 pixels in the neighborhood of the start boundary pixel.

According to an embodiment, rotating the reversed current direction to update the current direction includes:

rotating the reversed direction anticlockwise or clockwise to traverse a single pixel distance and thereby reach the diagonally adjacent pixel with respect to the current boundary pixel and in turn traverse the neighborhood of the current boundary pixel in about seven directions in accordance with the sub-steps (i) to (iii) of the step d).

According to an embodiment, the method further includes:

i) receiving the image for detection of the boundary of the object and subjecting the image to pre-processing as the primary image to result into the secondary image;

ii) receiving the secondary image for detection of the boundary of the object for splitting into a plurality of segments and indexing each segment of the plurality of segments in clockwise or anticlockwise order;

iii) identifying a row and a column with respect to each segment as edge row and edge column respectively, the edge row and the edge column indicating a periphery formed at each segment due to splitting of the secondary image into the plurality of segments;

iv) detecting in parallel the boundary of the object within each of the plurality of segments based on subjecting each of the plurality of segments to the steps b) to f) as claimed in claim 1 for detecting the boundary of the object in parallel for each of the plurality of segments;

(v) identifying at least one joining point upon each of the edge row and the edge column of each of the plurality of segments, each of the joining point representing a boundary pixel upon the detected boundary; and (vi) combining the plurality of segments through the identified one or more joining points in accordance with an index of the segment to generate a unified boundary representation from the detected boundary within each of the plurality of segments.

According to an embodiment, the identifying the at least one joining point of a first segment within the plurality of segments includes:

scanning the first segment along a direction of the edge row and the edge column;

detecting a first joining point at a first location within the edge row defined by:

a) meeting of the detected boundary with the edge row; and b) presence of a predefined number of boundary pixels in the plurality of segments adjacent to the first segment;

detecting a second joining point at a second location within the edge column defined by:

a) meeting of the detected boundary with the edge column; and b) presence of the predefined number of boundary pixels in the plurality of segments adjacent to the first segment.

According to an embodiment, the combining the plurality of segments through the identified one or more joining points further includes:

deleting a plurality of boundary pixels other than the first and second joining points on the edge row and the edge column of the first segment.

According to an embodiment, the method further includes:

generating a dataset for Machine Learning criteria based on the steps of:

determining a count of plurality of boundary pixels constituted by the start boundary pixel, the next boundary pixel and the further next boundary pixel;

generating a single row feature vector based on plurality of boundary pixels; for at least one image; and generating a combined dataset including multiple feature vector rows for one or more images based on the single row feature vector associated with each of the one or more images.

According to an embodiment, the generation of single row vector is based on a relative position information of the plurality of boundary pixels, said relative position information being with respect to a focal point input pixel as metadata input to indicate input features for classification or prediction through a machine learning or deep learning criteria.

The present disclosure may further provide a method including: processing an image to output a secondary image; scanning the secondary image in a scan direction from a start pixel in the secondary image to identify a boundary pixel found for the first time as satisfying a boundary criteria during the scanning the secondary image; identifying a next boundary pixel satisfying the boundary criteria by rotating the scan direction and scanning pixels in the secondary image along a circumferential direction centered on the boundary pixel identified previously, wherein the scanning the pixels starts from a pixel that is adjacent to the previously identified boundary pixel and located in the rotated scan direction; and identifying next boundary pixels until a complete contour of an object is obtained.

In one embodiment, when no next boundary pixel is identified during scanning pixels along a circumferential direction centered on the first next boundary pixel, a first next boundary pixel is excluded from the complete contour of the object and a second next boundary pixel satisfying the boundary criteria is identified and included in the complete contour of the object instead of the first next boundary pixel.

According to an embodiment, each pixel of the secondary image has a zero color value or non-zero color value, and the boundary criteria is satisfied when a corresponding pixel has the non-zero color value.

According to an embodiment, each pixel of the secondary image has a zero color value or non-zero color value, and the boundary criteria is satisfied when a corresponding pixel has the non-zero color value.

According to an embodiment, the scan direction corresponds to a west scan direction, an east scan direction, a north scan direction, or a south scan direction.

According to an embodiment, the start pixel is located at a middle of the secondary image.

According to an embodiment, the rotated scan direction is a west scan direction, an east scan direction, a north scan direction, a south scan direction, a north-west scan direction, a north-east scan direction, a south-west scan direction, or a south-east scan direction.

According to an embodiment, the start pixel is located at a left edge of the secondary image when the scan direction is an east direction, and the updated scan direction is a north-west direction or a south-west direction.

According to an embodiment, an angle between the rotated scan direction and its previous scan direction is equal to 135° or 225°.

According to an embodiment, the circumferential direction centered on the boundary pixel is a clockwise or anticlockwise direction centered on the boundary pixel.

According to an embodiment, the scanning the pixels includes: scanning at most 8 pixels along a circumferential direction centered on a boundary pixel identified first in the secondary image; and scanning at most 7 pixels along a circumferential direction centered on a boundary pixel identified second in the secondary image.

According to an embodiment, the complete contour of the object is obtained when a last identified boundary pixel as satisfying a boundary criteria during the scanning the secondary image.

According to an embodiment, the complete contour of the object is obtained by splitting the secondary image to a plurality of image segments; obtaining, in parallel, each contour of the object in each image segments; and obtaining the complete contour of the object in the secondary image based on each contour in each image segment.

According to an embodiment, an edge boundary pixel identified at an intersection edge of each image segment is excluded from the complete contour of the object.

According to an embodiment, the plurality of image segments include a first quadrant image segment, a second quadrant image segment, a third quadrant image segment, and a fourth quadrant image segment, a first scan direction from a first start pixel in the first quadrant image segment and a fourth scan direction from a fourth start pixel in the fourth quadrant image segment are identical, a second scan direction from a second start pixel in the second quadrant image segment and a third scan direction from a third start pixel in the third quadrant image segment are identical, and the first scan direction and the second scan direction are opposite.

At least based on the aforementioned features, the input feature set may be reduced. Input feature set reduction may be achieved for image-based multi-classification using a data pre-processing pipeline and the contour detection method. A parallelized contour detection method may further render more time-efficiency in terms of contour detection. According to an embodiment, a fast small foot-print model for real-time inferencing may be realized and thereby rendering a simpler and faster data-preprocessing for real-time image multi-classifier for constrained edge devices like micro-controllers and parallelized implementation. More specifically, the application of decision tree-based algorithms for faster real-time inferencing with smaller model size is especially suitable for constrained edge devices.

To further clarify the advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein:

FIGS. 6A and 6B are diagrams for comparing example contour-detection mechanisms of the present disclosure and state-of-the-art mechanisms for contour detection;

FIGS. 7A and 7B are diagrams for comparing example contour-detection mechanisms of the present disclosure and state-of-the-art mechanisms for contour detection;

FIGS. 9A, 9B, and 9C illustrate an example parallelized contour detection mechanism in accordance with an embodiment of the present disclosure;

FIGS. 10A and 10B illustrate example process of finding stitch-points and detecting a final boundary, in accordance with an embodiment of the present disclosure;

FIGS. 13A, 13B, 14A, 14B, 14C, 14D, 15A, and 15B illustrate various exemplary uses cases, in accordance with an embodiment of the present disclosure

Figure 1:
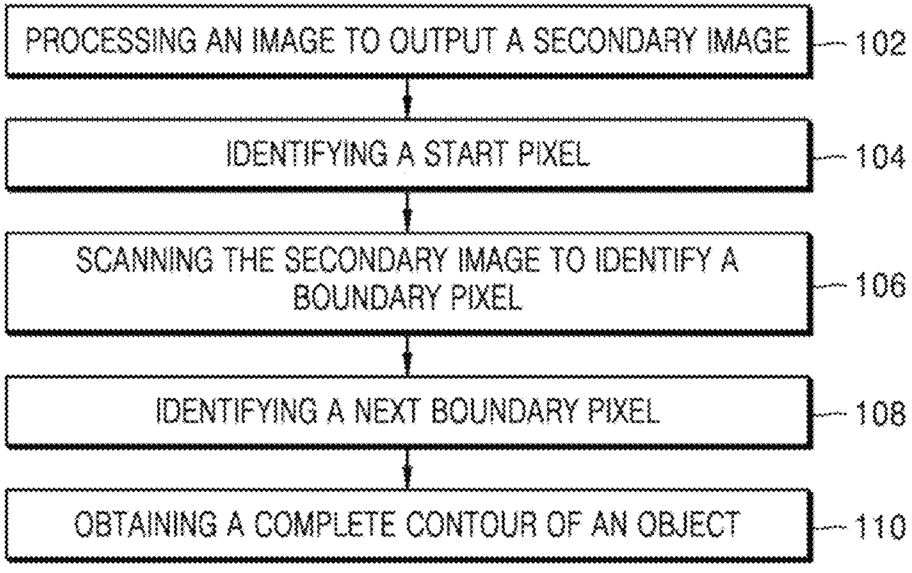
FIG. 1 is a flowchart of an example method in accordance with an embodiment of the disclosure.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION

Various example of the disclosure will now be described in greater detail below with reference to the accompanying drawings. However, the disclosure may have different forms and should not be understood as being limited to example embodiments of the disclosure set forth herein. Parts not related to the disclosure may be omitted for clarity, and like reference numerals denote like elements throughout.

The terms and words used in the following description and claims are not limited to the bibliographical meanings, but, are merely to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a", "an" and "the" are intended to include the plural forms as well, unless the context clearly indicates otherwise. It should be understood that the terms "comprising," "including," and "having" are inclusive and therefore specify the presence of stated features, numbers, steps, operations, components, units, or their combination, but do not preclude the presence or addition of one or more other features, numbers, steps, operations, components, units, or their combination. In particular, numerals are to be understood as examples for the sake of clarity, and are not to be construed as limiting the embodiments by the numbers set forth.

Herein, the terms, such as " . . . unit" or " . . . module" should be understood as a unit in which at least one function or operation is processed and may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an embodiment of the disclosure.

Expressions, such as "at least one of," when preceding a list of elements, modify the entire list of elements and do not modify the individual elements of the list. For example, the expression "at least one of a, b or c" indicates only a, only b, only c, both a and b, both a and c, both b and c, all of a, b, and c, or variations thereof.

According to the disclosure, functions related to artificial intelligence (AI) may operate via a processor and a memory. The processor may include one or more processors. The one or more processors may include a general-purpose processor such as a central processing unit (CPU), an application processor (AP), a digital signal processor (DSP), a dedicated graphics processor such as a graphical processing unit (GPU) or a vision processing unit (VPU), a dedicated AI processor such as a neural processing unit (NPU), or the like, but is not limited thereto. The one or more processors may control input data to be processed according to predefined operation rules or an AI model stored in the memory. When the one or more processors are a dedicated AI processor, the dedicated AI processor may be designed with a hardware structure specialized for processing a specific AI model.

The predefined operation rules or AI model may be created via a training process. The predefined operation rules or AI model may, for example, be set to perform desired characteristics (or purpose) created by training a basic AI model with a learning algorithm that utilizes a large number of training data. The training process may be performed by a device for performing AI or a separate server and/or system. Examples of the learning algorithm may include, without limitation, supervised learning, unsupervised learning, semi-supervised learning, and reinforcement learning, but embodiments of the disclosure are not limited thereto.

The AI model may include a plurality of neural network layers. Each of the neural network layers may have a plurality of weight values and may perform various neural network computations via arithmetic operations on results of calculations in a previous layer and a plurality of weight values in the current layer. A plurality of weights in each of the neural network layers may be optimized by a result of training the AI model. For example, a plurality of weights may be updated to reduce or minimize a loss or cost value acquired by the AI model during a training process. An artificial neural network may include, for example, and without limitation, a deep neural network (DNN) and may include, for example, and without limitation, a convolutional neural network (CNN), a DNN, a recurrent neural network (RNN), a restricted Boltzmann machine (RBM), a deep belief network (DBN), a bidirectional recurrent DNN (BRDNN), deep Q-networks (DQN), or the like, but is not limited thereto.

Hereinafter, various embodiments of the disclosure will be described in greater detail with reference to the accompanying drawings.

FIG. 1 is a flowchart of an example method in accordance with an embodiment of the disclosure. The present disclosure provides a method for the detection of a boundary of an object in an image based on contour-detection during image-processing.

The method may include processing (step 102) an image to output a secondary image. In an embodiment, the processing the image includes processing the image for detection of a boundary of an object and subjecting the image to pre-processing as a primary image to output the secondary-image having a lower number of color values than the primary image. A color value having a value of zero may be referred to as a zero color value. A color value having a value of non-zero may be referred to as a non-zero color value. In an embodiment, the color values in the images may include at least one zero color value and at least one non-zero color value. The color value may be referred to as a pixel value.

In an embodiment, the pre-process may be omitted, and the received image may be directly used as the secondary image.

In an implementation, the pre-process may include analyzing the primary image as a color image, a grayscale image, or both of them. The pre-process may include resizing the primary image to reduce an input feature set associated with the primary image. The pre-process may include transforming the primary image into a binary image exhibiting a zero color value and a non-zero value. The non-zero value of the binary image may have a value of 1. The pre-process may include transforming the resized primary image into the binary image.

In an example scenario, images may be captured from live camera feed or other modes of image, and the captured images may be cropped to have a specified size (e.g 200×200 pixels, 100×100 pixels, 50×50 pixels, 28×28 pixels, etc.), and then resized. Thereafter, the resized-image for faster processing like 200×200 may be converted from a coloured image to a gray-scale image. Thereafter, the gray scale image may be converted into a binary image wherein two values such as zero or 1 represent pixel values.

The method may further include identifying (step 104) a start pixel in the secondary image for scanning the secondary image. The start pixel may have the zero color value and be located outside a boundary of the object within the secondary image. The start pixel may be located at an edge of the secondary image. The start pixel may be located at a middle of the edge of the secondary image, but is not limited thereto. For example, the start pixel may be located at a top or bottom of the edge of the secondary image.

The method may further include scanning (step 106) the secondary image to identify a boundary pixel for the first time as satisfying a boundary criteria during the scanning the secondary image. The secondary image is scanned in a scan direction from the start pixel in the secondary image to identify the boundary pixel. The scan direction from the start pixel may be identified as a direction initiating from a default direction. The default direction may be an east (left to right) direction, but is not limited thereto. In an embodiment, the scan direction may be updated iteratively while the secondary image continues to be scanned.

In an example, the method may include setting up a default direction and start pixel in the secondary image to detect a first boundary pixel.

The boundary criteria may be satisfied when a corresponding pixel has the non-zero color value, but is not limited thereto.

The method may further include identifying (step 108) a next boundary pixel satisfying the boundary criteria.

Identification of boundary pixels may be performed based on contour-detection criteria. The contour detection criteria comprises identifying a next boundary pixel, as having the non-zero color value, around a current boundary pixel. The next boundary pixel having the non-zero color value may be identified among 8 neighborhood pixels around the first identified boundary pixel.

As a part of the contour detection criteria for identifying next boundary pixels, the method may further include identifying a next scan direction by reversing the current scan direction and rotating the reversed current scan direction anticlockwise or clockwise to reach a diagonally adjacent pixel in the neighborhood of the current boundary pixel. The neighborhood pixel may be located diagonally to the current boundary pixel. The neighborhood pixel may be referred to as an adjacent pixel. The neighborhood pixel located diagonally to the current boundary pixel may be referred to as a diagonally adjacent pixel. The rotating of the reversed current scan direction to update the current scan direction may include rotating the reversed scan direction anticlockwise or clockwise to traverse a single-pixel distance and thereby reach the diagonally adjacent pixel with respect to the current boundary pixel. The scan direction may be simply referred to as a direction. The next direction may be mathematically represented as follows:

ND (Next Direction)=Opposite of CD (Current Direction)+1 in anti-clockwise/clockwise direction.

The current direction or the next direction may correspond to left to right (east) direction, right to left (west) direction, upward (north) direction, downward (south) direction, north-east direction, north-west direction, south-east direction, or south-west direction within the secondary image. The first scan direction may be an east direction, an east direction, a north direction, or a south direction.

From the diagonally adjacent pixel, the scanning may be initiated in anti-clockwise or clockwise to identify a pixel having the non-zero color value as the next boundary pixel in the neighborhood of the current boundary pixel. The next boundary pixel may be either linearly or diagonally adjacent to the current boundary pixel. The scanning of the next neighborhood pixels of the current boundary pixel may include scanning at most 7 or 8 pixels around the current boundary pixel.

Once such next boundary pixel is identified in the neighborhood of the start pixel, the scanning may be resumed from the next boundary pixel and the scanning may be re-executed in respect of the updated direction to determine a further next-boundary pixel. However, based on ascertaining an absence of at least one pixel having the non-zero color value in the neighborhood of the next boundary pixel and ignoring the already located pixels having non-zero value, scanning of the secondary image may be re-executed in the current direction from the current boundary pixel (which may be for example a start boundary pixel) in respect of the updated direction to determine a further next boundary pixel.

One or more further next boundary pixels are identified based on iteratively scanning the secondary till attainment of a complete contour of the object in the secondary image. Attainment of the complete contour of the object in the secondary image may include detecting the next boundary pixel or the further next boundary pixel achieving a pixel end condition. The pixel end condition is achieved when an identified boundary pixel is located at an end portion of the secondary image. Such end-portion of the secondary image may be defined by a condition as one of:

prohibiting a forward scanning of the secondary image without backtracing, and permitting a forward scanning of the secondary image by retracing.

The method may further include obtaining (110) a complete contour of the object in the secondary image. based on one or more boundary pixels identified and traced through the start boundary pixel and the one or more next boundary pixels in steps 106 and 108. Accordingly, such obtained contour may provide an optimized feature points as a reduced data set to train and test a machine learning criteria or deep learning criteria for image classification.

Figure 2A:
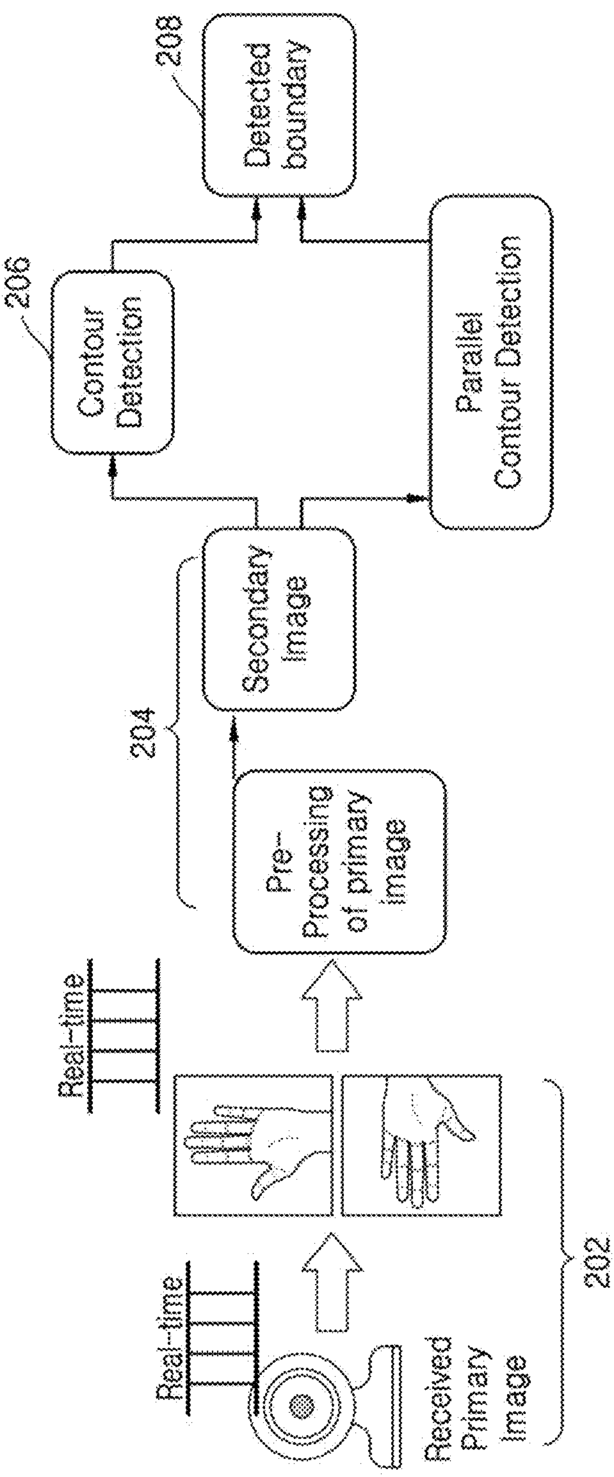
FIG. 2A is a flowchart of an example method of pre-processing an image in accordance with an embodiment of the disclosure.

FIG. 2A is a flowchart of an example method of pre-processing an image in accordance with an embodiment of the disclosure.

Step 202 represents example images in the form of live camera feed and accordingly constitutes primary images as per step 102. The images for example may include objects such as hand impression/gestures that need to be identified through detecting boundary based on contour tracing as referred in FIG. 1. In other example, a presence identification of person in real time may be executed for tilt-able display and accordingly the images may include images of the human being proposed to be detected and/or identified in the image.

Step 204 represents the pre-process of the primary images through resizing, conversion into grayscale or monochrome, conversion of grayscale/monochromatic image into a binary image etc. to output the secondary image corresponding to step 102.

Figure 2B:
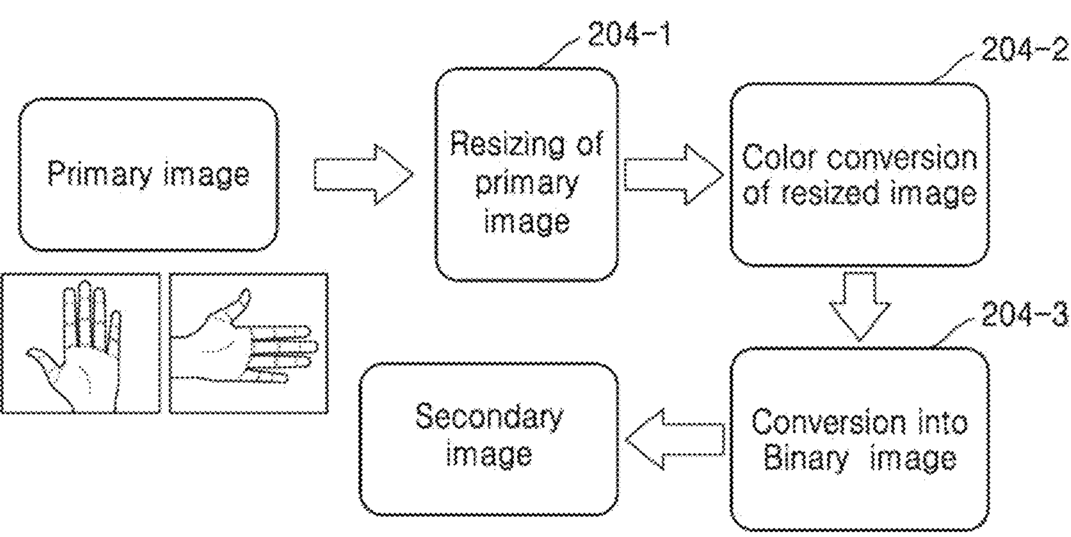
FIG. 2B is a flowchart of an example method of converting an image in accordance with an embodiment of the disclosure.

FIG. 2B is a flowchart of an example method of converting an image in accordance with an embodiment of the disclosure.

The sub-steps may include step 204-1 as resizing of the primary image, step 204-2 as color conversion of the resized primary image, for example from color image to gray scale image, and then converting the color converted image (e.g. gray scale image) into the binary image at step 204-3. The binary image obtained as output of the step 204-3 is referred to as the secondary image.

Now referring back the description of FIG. 2*a*, the process may further include Step 206 that in turn represents the application of contour-detection criteria in accordance with an embodiment of the disclosure as referred in steps 104 till 110 in FIG. 1. Alternatively, a parallelized contour detection criteria may be applied in accordance with steps 104 till 110 in FIG. 1, and will be further depicted as an alternate embodiment in the description of FIGS. 8 till 10.

Step 208 represents a generated dataset or detected boundary of the hand gesture based on step 206. Such generated dataset may correspond to a reduced data-set in the form of object boundary.

Figure 2C:
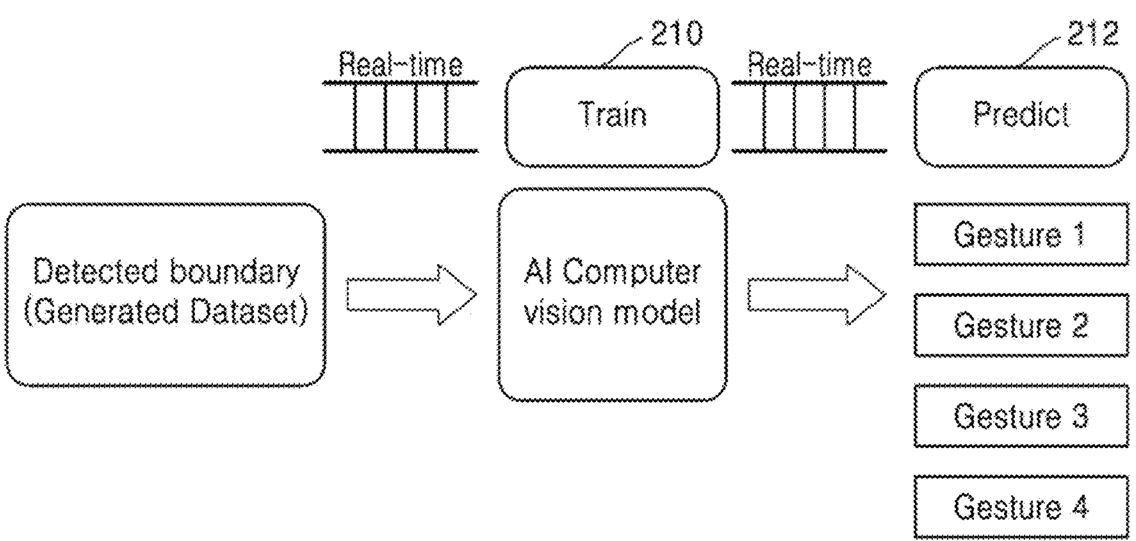
FIG. 2C is flowchart of an example method of training a machine-learning model with a detected boundary in accordance with an embodiment of the disclosure.

FIG. 2C is flowchart of an example method of training a machine-learning model with a detected boundary in accordance with an embodiment of the disclosure.

Step 210 represents execution of decision tree-based image classification criteria or a lighter deep learning criteria (lighter neural-network criteria such as Proto NN, Bonsai, etc.) for training an AI-Computer vision model (e.g. decision tree architecture, machine learning model or deep learning architecture) for image classification based on the reduced dataset from step 208.

Step 212 represents prediction of the detected object in the image as hand gesture. In an example, the gesture may be identified a singular gesture or a series of gestures (Gesture 1, 2, 3 . . . ). For example, the gestures may be identified as a top gesture, a right gesture, a left gesture etc. based on a direction of a gesture body such as a hand as described fin FIGS. 2A and 2B. In other example, the prediction may also include other example image classification such as detecting presence of person, or gesture-recognition. The same facilitates confidentiality because only contours of the object or person are traversed to detect a whole boundary of the object without analyzing the entire image data.

Figure 3:
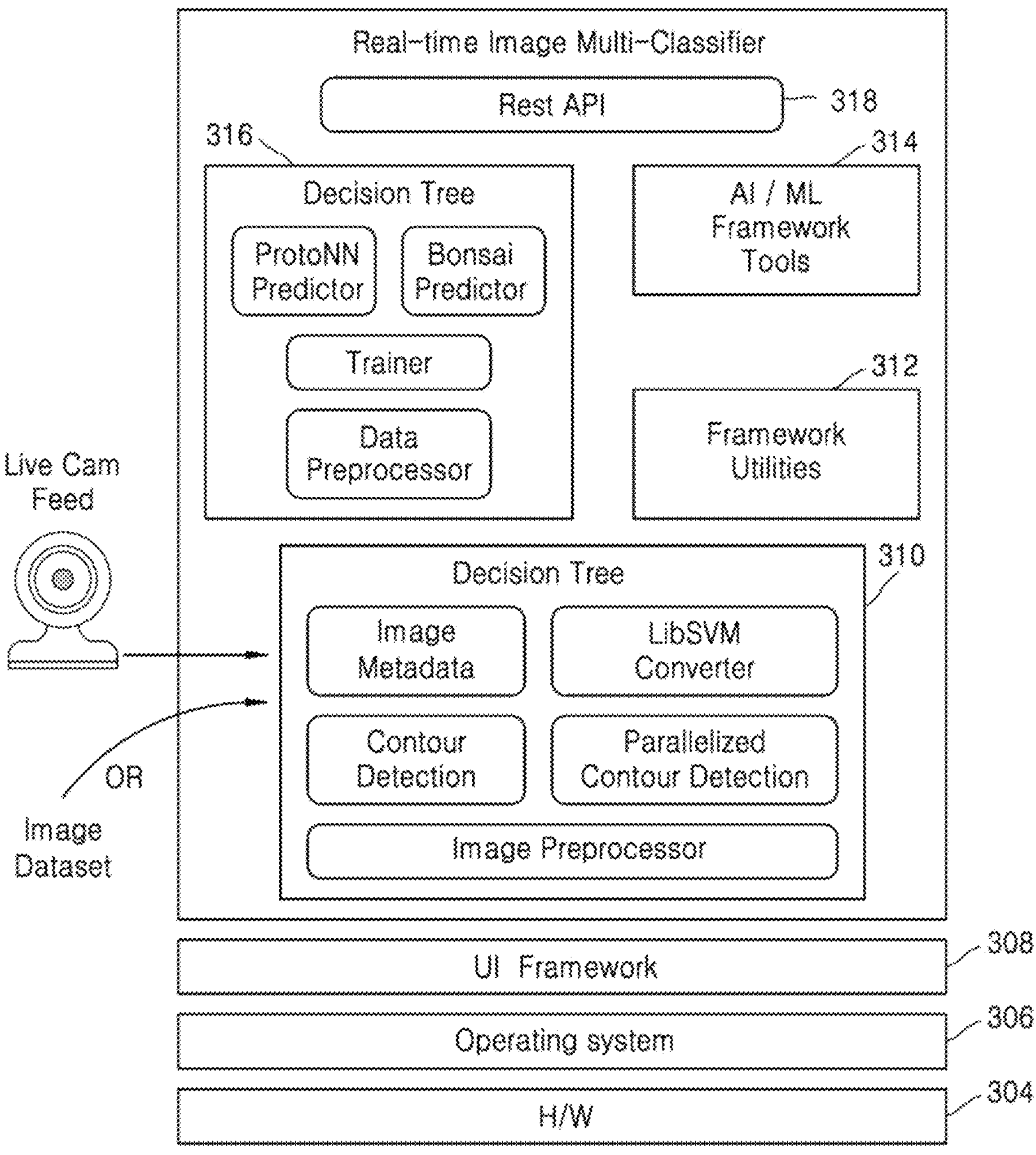
FIG. 3 is a block diagram of an example architecture in accordance with an embodiment of the present disclosure.

FIG. 3 is a block diagram of an example architecture in accordance with an embodiment of the present disclosure.

The architecture may be referred by the following components as depicted in following paragraph.

An input interface user device 302 receives an input image from either live camera feed (imaging device) or from other external source like image dataset. Such user device may be defined by a hardware assembly 304 corresponding to a Smart TV or IoT or other device, an operating system 306 that may be for example Tizen or Windows or Android.

The architecture 300 may further include a UI Framework 308 to capture an input image and display. Image Processing Modules 310 may include modules related to image pre-processing such as cropping, image splitting, resizing, color to gray scale, thresholding, contour detection, parallelized contour detection, conversion of image artefacts to machine learning required format (like libsvm) as described above.

The same may correspond to an image conversion module, boundary detection module, image splitter and image combiner module.

The architecture 300 may further include framework utilities 312 for real-time data pre-processing pipeline, and diagnostics.

The architecture 300 may further include AI/ML Framework Tools 314 such as Standard ML Training and Inferencing for use as an alternative to C++-based implementation.

The architecture 300 may further include decision tree-based methods 316 for faster training and inferencing with compact model-size suitable for real-time processing on constrained devices. The architecture 300 may further include application programing interface 318 as a standardized API access. In an example, the architecture 300 may further include Usecase Specific View Models: For implementing application scenarios and actions based on image multi-classification.

Figure 4A:
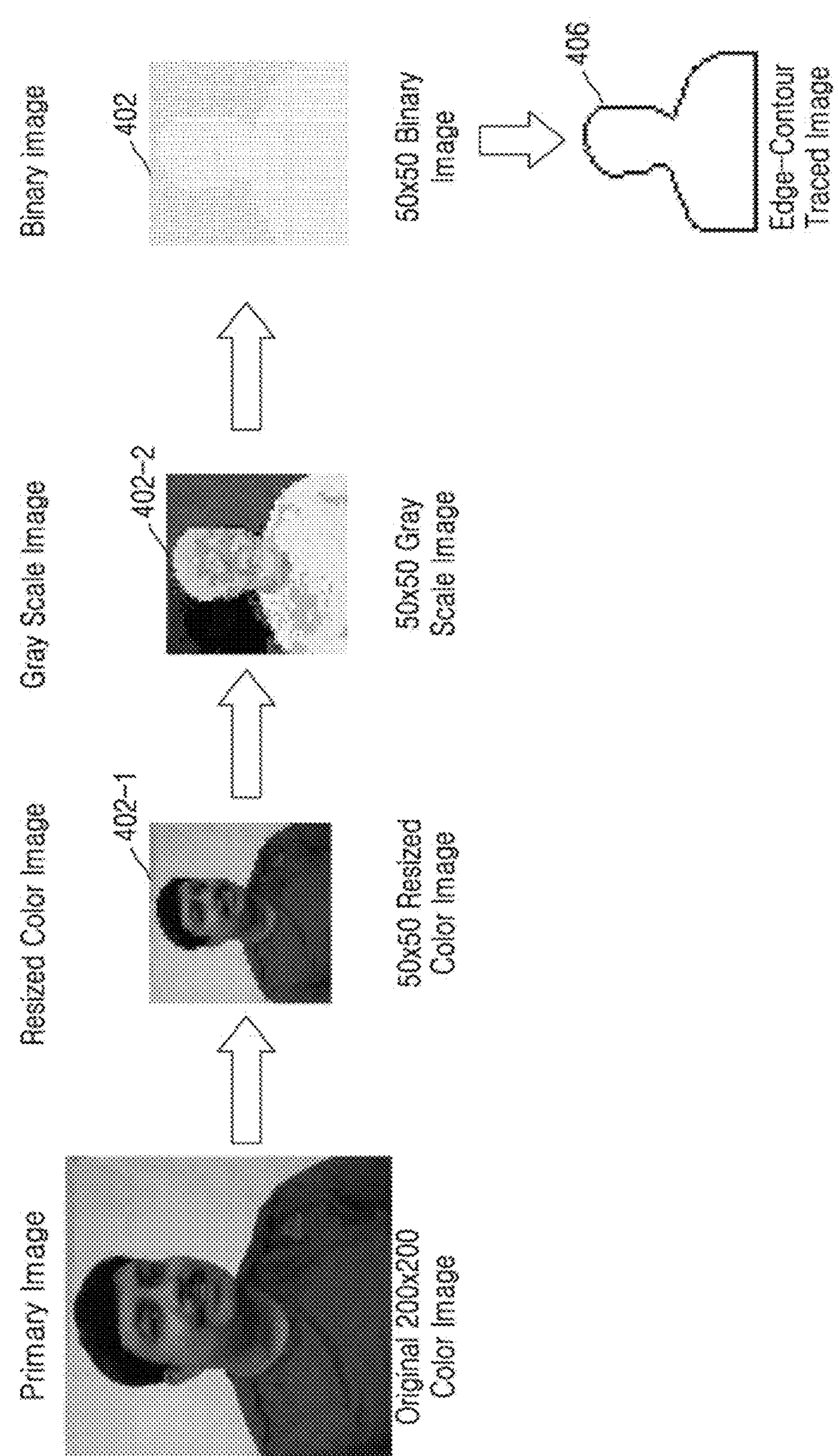
FIGS. 4A, 4B, and 4C illustrate a pre-processing stage in accordance with an embodiment of the present disclosure.
Figure 4B:
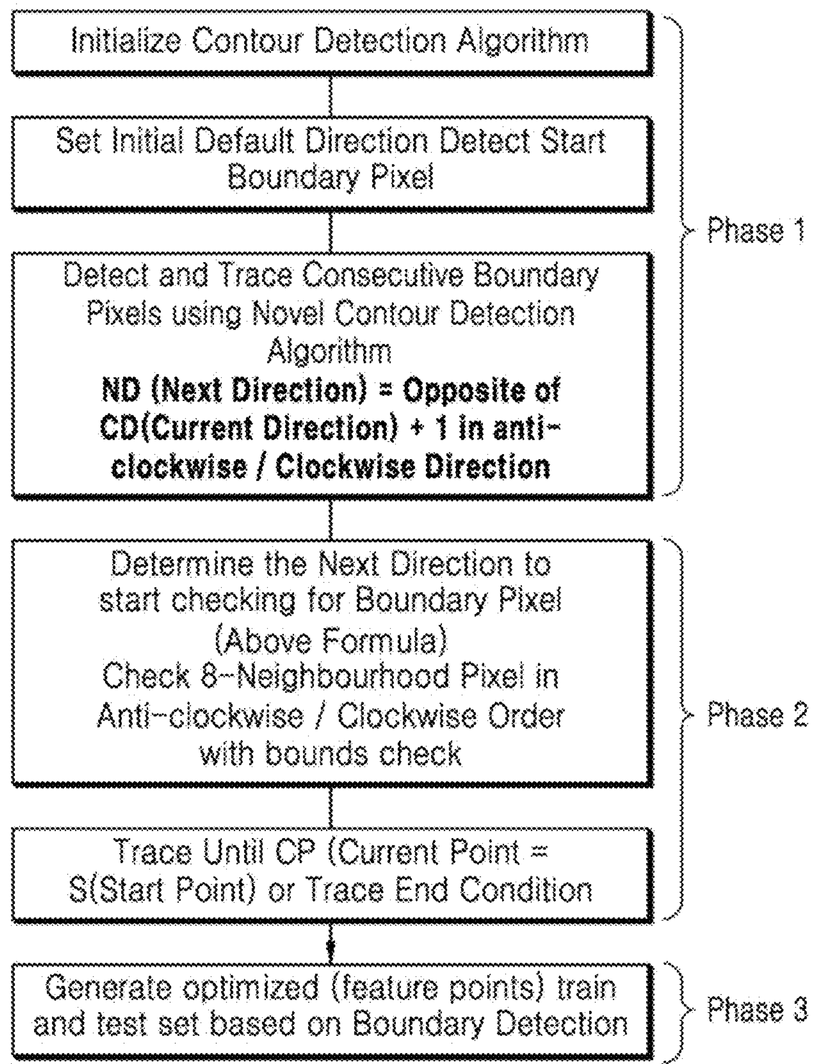
Figure 4C:
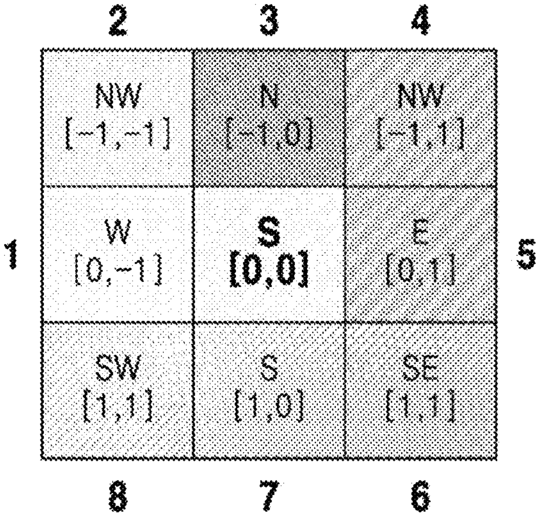

FIGS. 4A, 4B, AND 4C illustrate a pre-processing stage in accordance with an embodiment of the present disclosure.

For the image-based classification, the input images or the primary images may be pre-processed in order to enhance the quality of the features that are extracted to be used for further analysis/classification and prediction by AI-Computer vision models based on artificial intelligence, machine learning or deep learning architectures. Examples may include decision tree models and NN models.

Referring to FIG. 4A, at step 402, the original input color image 402 may be cropped, resized, and converted into a gray-scale or black and white image. Step 402 may include sub steps.

Step 402-1 denotes resizing of the primary image.

Step 402-2 denotes color conversion of the resized primary image for example to gray scale.

Figure 8A:
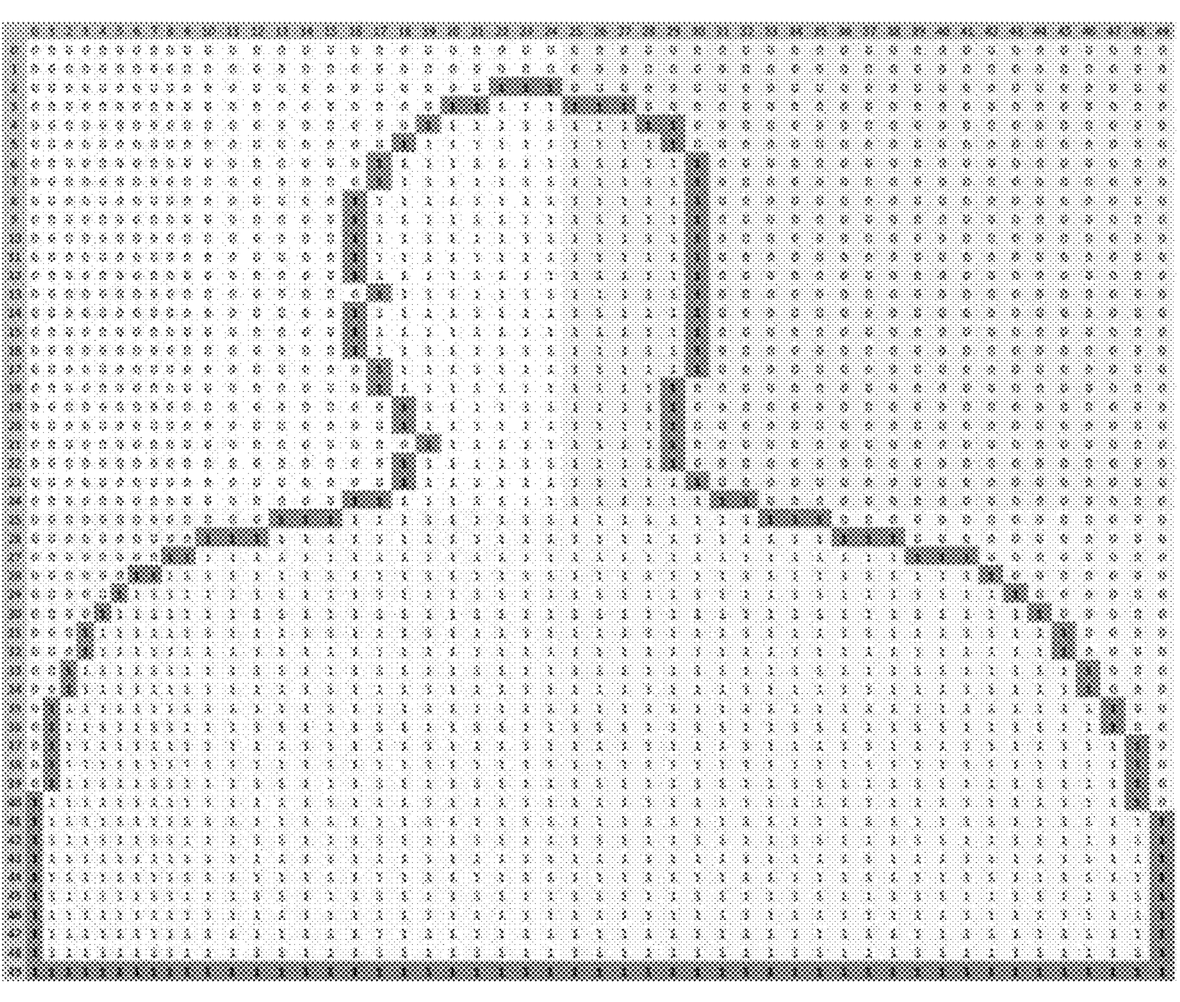
FIGS. 8A, 8B, 8C, and 8D illustrate an example parallelized contour detection mechanism in accordance with an embodiment of the present disclosure.

Further, at step 404, the color converted image (e.g. gray scale) may be converted into a binary image to obtain the secondary image. The secondary image may be the binary image. The binary image shown in FIG. 4A corresponds to a binary image shown in FIG. 8A. Referring to FIG. 8A, the binary image has pixels having a zero color value represented by “0” or a non-zero color value represented by “1”.

At step 406, the contour detection in accordance with steps 104 till 110 in FIG. 1 may be performed upon this binary image received from step 404. The contour detection as performed on the binary image is represented in terms of Phases 1, 2 and 3 as depicted in FIG. 4B.

FIG. 4B refers contour detection in accordance with steps 104 till 110 of FIG. 1. In an example, the contour detection may be divided into multiple phases such as Phases 1, 2 and 3.

Phase 1 corresponds to step 104, 106 and 108 and correspond to an initialization phase. Phase 1 may be divided into following sub-steps 1 and 2.

Step 1 corresponds to establishing a starting point S (a start-boundary pixel that is identified for the first time) for contour detection and corresponds to steps 104, 106. The process starts from a start pixel (as per step 104). The start point, that is the start boundary pixel, may be identified based on a precursor scan or traversal of the image which may be either from top to bottom (or from bottom to top) or left to right (or right to left) or a combination thereof. In an example, the traversal may be a diagonally executed scan to identify the start point in the secondary image. In an example, the start point may be at a middle of the height of the image as same with the start pixel, e.g. located at from row 3 column 23 of 50×50 binary image depicted in step 404 of FIG. 4A. A current scan direction initiating from a default direction may be set as East. Based on the step 104 of FIG. 1, the start boundary pixel in accordance with step 106 may be set as S=i,j. In an example, S=0,0 as depicted in FIG. 4C. More specifically, as a part of step 104, the scanning of the secondary image may be start from the start pixel to a right direction (east direction) to identify the first non-zero value as the start boundary pixel referred in step 106 of FIG. 1.

Step 2 corresponds to step 108 and refers scanning of at most 8 neighborhood pixels of the start boundary pixel S in an anti-clock wise direction. Scanning may be started based on an updated scan direction. The updated scan direction may be determined by reversing the current-direction (which is East, block 5, as shown in FIG. 4C), and rotating the reversed direction to 1 in anti-clockwise direction. Accordingly, the updated direction is West+1 and as West is represented by block 1 in FIG. 4C for anti-clockwise, therefore, the updated direction is denoted by block 2 in FIG. 4C for anti-clockwise, e.g., SouthWest.

The update of direction may be represented as:

ND (Next Direction)=OD (Opposite Direction) of CD (Current Direction)+1 e.g. if current direction is East, Opposite Direction of Current Direction (East) is West, 1 is added in anticlockwise direction to West, and the Next Direction would be SouthWest. So ND=SouthWest. Accordingly, the direction numbering from W, SW, S is 1, 2, 3, . . . and ends at NW at 8 as depicted in FIG. 4C under a title of “anti-clockwise”.

In other example of clockwise direction, if current-direction is East, Opposite Direction of Current Direction (East) is West, 1 is added in clockwise direction to West, and the Next Direction would be NorthWest. So ND=NorthWest. Accordingly, the direction numbering from W, NW, N is 1, 2, 3 and ends at SW at 8 as depicted in FIG. 4C under a title of “clockwise.”

Resuming with anticlockwise pattern step 2, wherein if a scanned pixel has a color value of 1 in SouthWest, then the scanning may continue in anti-clockwise direction until a non-zero value or a next boundary pixel is found. The Current Point (CP) may be updated as a next boundary pixel that is found next, and the current direction may be accordingly set to a direction from the S (0,0) to the next boundary pixel. Thereafter, Step 2 is re-executed in terms of such current direction which is actually referred as below mentioned Phase 2.

Phase 2 refers the contour detection process and corresponds to reoccurrence of the operation depicted in Step 2 of Phase 1.

In other words, the Phase 2 corresponds to a ‘iteration’ of the identifying next boundary pixels and refers the operation of step 110 of FIG. 1.

With respect to Phase 2, “TraceEnd” condition may be defined as a terminating condition if there is nowhere to go from current point, CP, (the last boundary pixel) without back-tracing. The operation may be accordingly terminated, if CP reaches Starting Point of Phase 1 (the last boundary pixel is the start boundary pixel) or the Trace-End condition has been met. The Trace-End condition may be represented as follows:

Phase 3 denotes generation of a dataset based upon boundary detection performed in Phase 2. More specifically, as a part of Phase 3, the dataset of optimized feature points as training and test set may be generated based on boundary detection. The dataset may correspond to dataset referred in step 208 of FIG. 2C and may be used for training and testing the deployed AI computer vision model, as referred in preceding description.

As may be observed, adopting aforesaid approach for scanning proves efficient for most diagrams which have well-defined straight edges as it checks for convex edges and converge fast in lesser iterations. The same also lends utility for neural-network-based image classification as the number of input features is substantially reduced with only contours which makes it faster for training neural networks and also for faster prediction (inferencing) in real-time.

FIGS. 5A, 5B, 5C, and 5D illustrate an example mechanism of contour detection criteria in accordance with an embodiment of the present disclosure.

Figure 5A:
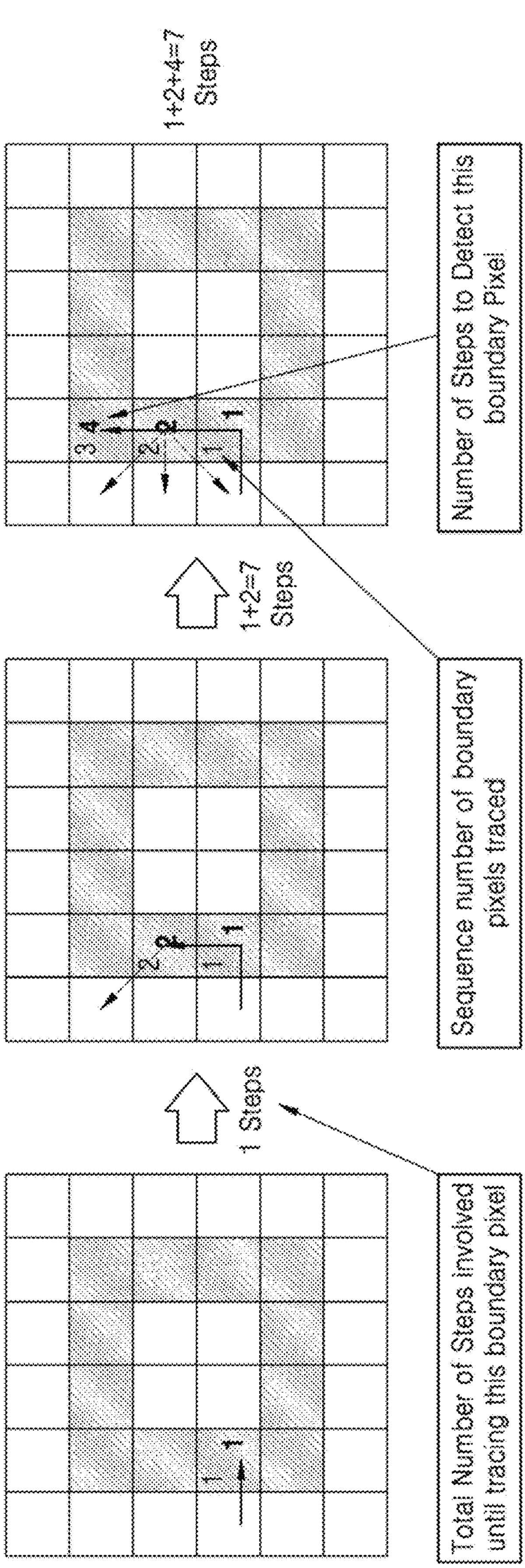
FIGS. 5A, 5B, 5C, and 5D illustrate an example mechanism of contour detection criteria in accordance with an embodiment of the present disclosure.
Figure 5B:
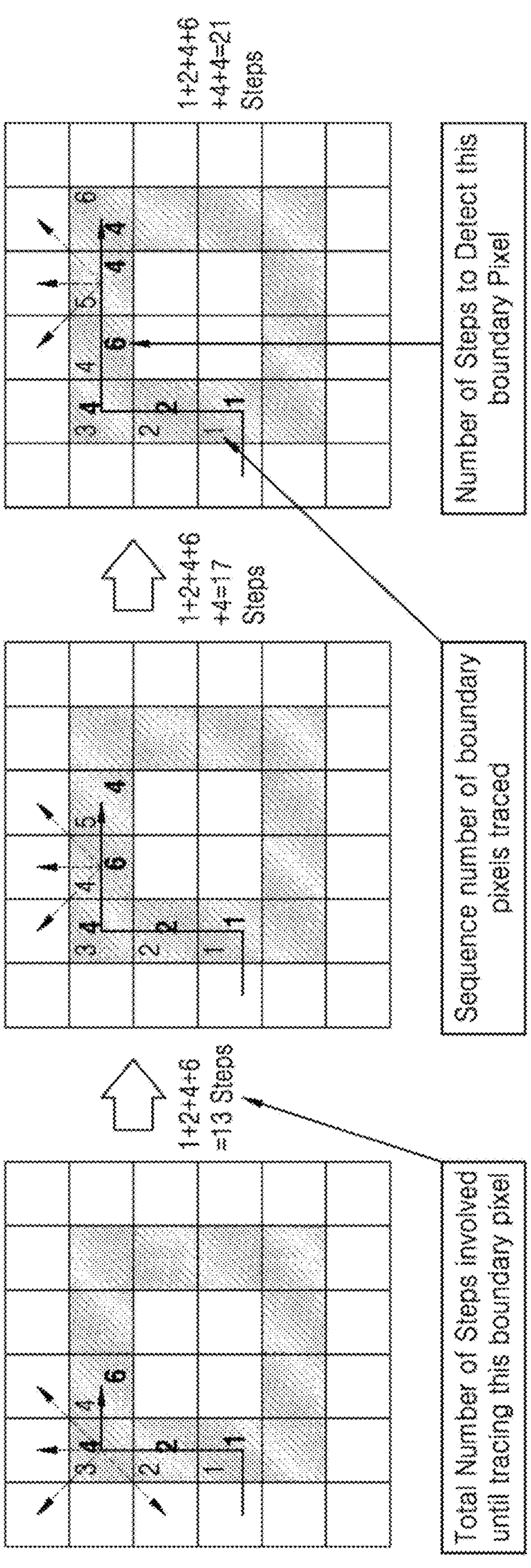
Figure 5C:
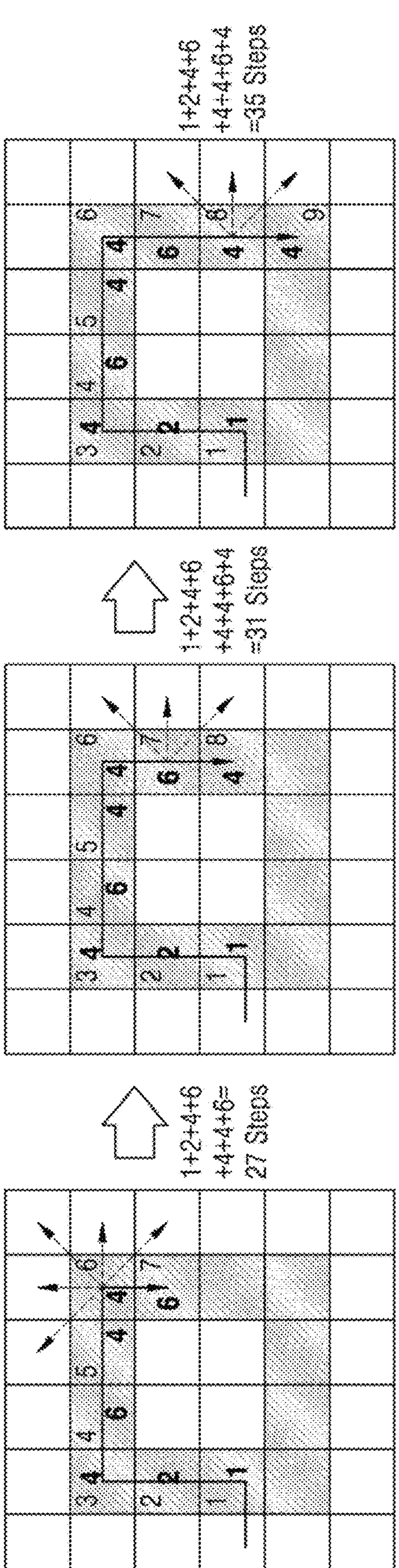
Figure 5D:
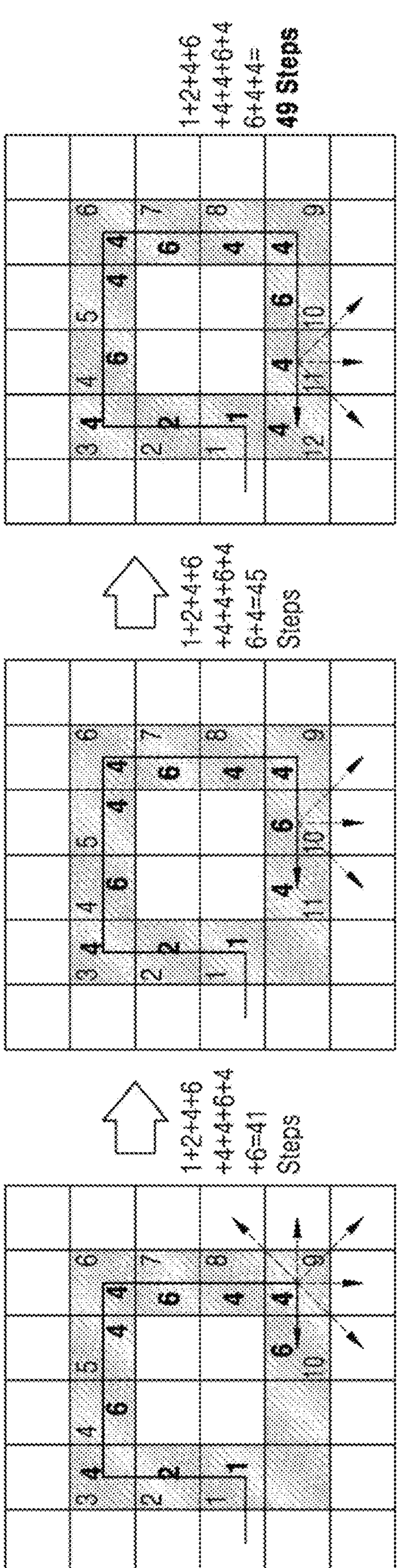

Left diagrams in FIG. 5A represent the Phase 1. Middle and right diagrams in FIG. 5 and diagrams of FIGS. 5B, 5C, and 5D represent the Phase 2. Further, the boundary formed based on contour detection in FIG. 5D also represents the Phase 2. Overall, a total of 49 Steps are required to detect 12 Boundary Pixels using the contour detection criteria described herein. This contrasts with state art of the art contour-detection wherein otherwise a total of 67 steps are required to detect 12 boundary pixels.

Figure 6A:
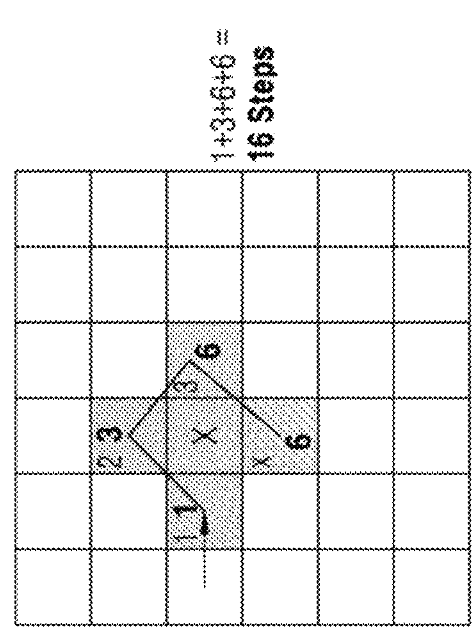
Figure 6A:
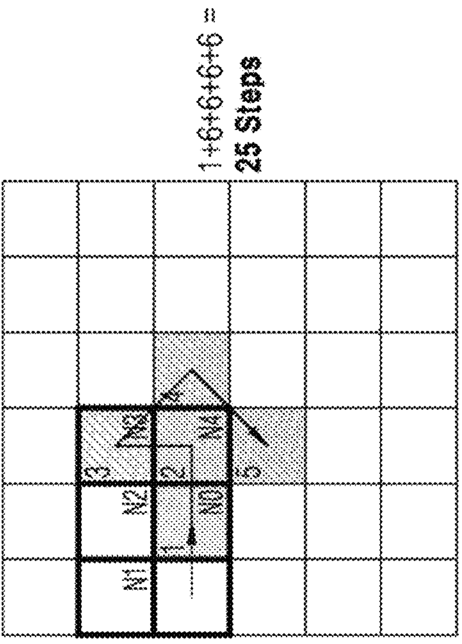

FIGS. 6A and 6B are diagrams for comparing example contour-detection mechanisms of the present disclosure and state-of-the-art mechanisms for contour detection.

A left diagram in FIG. 6A illustrates contour detection of a representation by identifying 5 pixels and consuming 25 processing steps by state of the art mechanism. On the other hand, in accordance with an embodiment of the disclosure, only 4 pixels are identified as part of contour detection in 16 steps as shown in a right diagram in FIG. 6A.

A left diagram in FIG. 6B illustrates contour detection of a representation by identifying 7 pixels and consuming 37 processing steps by state of the art mechanism. On the other hand, in accordance with an embodiment of the disclosure, 7 pixels are identified as part of contour detection in 26 steps and a more accurate outer boundary is formulated based on contour-detection as shown in a right diagram in FIG. 6B.

Figure 7A:
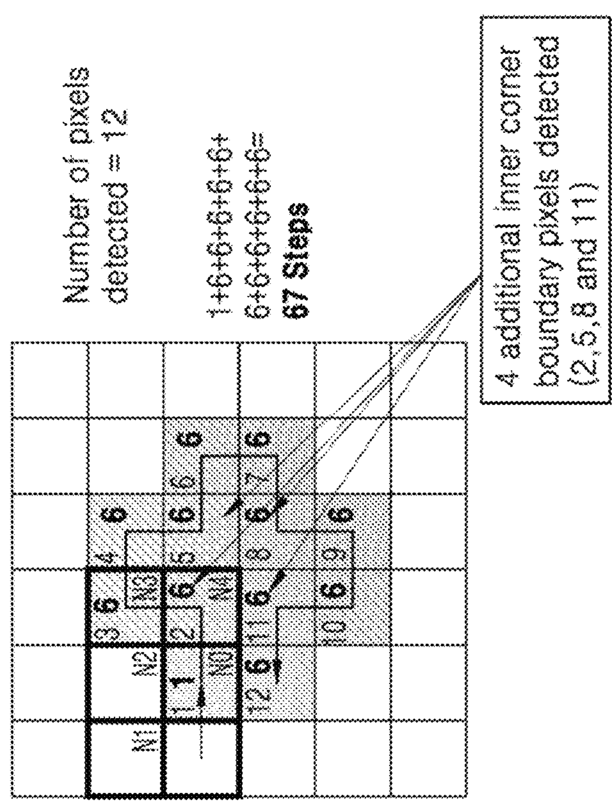

FIGS. 7A and 7B are diagrams for comparing example contour-detection mechanisms of the present disclosure and state-of-the-art mechanisms for contour detection.

A left diagram in FIG. 7A illustrates contour detection of a representation by identifying 12 pixels and consuming 67 processing steps by state of the art mechanism. 4 additional inner corner boundary pixels (2, 5, 8 and 11) are detected that otherwise may have been avoided. On other hand, in accordance with an embodiment of the disclosure, only 8 pixels are identified as part of contour detection merely in 35 steps as shown in a right diagram in FIG. 7A. As may be observed, inner corner pixels are not detected and only outer boundary pixels are detected. Accordingly, lesser number of pixels are detected, thereby denoting lesser number of input features to be processed in next-stage by NN or Machine Learning and also faster contour detection time.

A left diagram in FIG. 7B illustrates contour detection of a representation by identifying 8 pixels and consumes 43 processing steps by state of the art mechanism. On other hand, in accordance with an embodiment of the disclosure, 8 pixels are identified as part of contour detection in 21 steps and a more accurate outer boundary is formulated based on contour-detection as shown in a right diagram in FIG. 7B.

The comparisons as provided in FIGS. 6A, 6B, 7A and 7*d* indicate that the contour detection in accordance with an embodiment of the disclosure is faster and simpler than the state-of-the-art for contour detection. The same is especially aimed at reducing input-feature set for further processing by neural network or other machine learning algorithms.

In an example, the present disclosure provides a fast efficient NN or machine learning method to perform classification/prediction based on input images captured from web-cam based on reducing pre-processing time involved for processing images before being processed by NN or Machine Learning method. Given a particular order of processing like in clockwise or anti-clockwise direction. According to an embodiment, all the boundary pixels are detected to yield accurate detection of only outer contour boundary pixels. In addition, the contour detection method avoids detecting unnecessary pixels by avoiding retracing back to previously detected boundary pixel and saves processing. Further, the present contour detection ensures not missing necessary boundary pixels.

Overall at least view of the description of FIGS. 6A, 6B, 7A, and 7B, the contour detection in accordance with an embodiment of the disclosure exhibits following features:

Identifying the first and 2nd boundary (contour) pixel is easy based on an initial scan direction.

The initial comparison (checks) requires less steps than state of the art methods, for example, as only 3 steps are expended as compared to 6 Steps, this is per new boundary pixel to be identified.

Since the next boundary pixel is identified based on direction e.g. Next Direction=Current Direction+1, in anticlockwise there is no need of backtracking. Accordingly, the total number of steps expended per boundary pixel are substantially less than the state of the art. In an example, only 5 steps are expended instead of 6 Steps per new boundary pixel to be identified.

The next direction may be easily computed and stored as a map along with offsets to next pixel which further reduces the computation time.

In best case it requires only 1 step to find the next boundary pixel. In average case scenario it takes only 4 steps to find the next boundary pixel. In worst case all algorithms requires 8 checks to neighborhood pixel, although this novel new algorithm requires at most 7 checks around each boundary pixel.

The input feature set is reduced from to the number of contour pixel. For example, for 28×28 image, 784 is reduced to −87 or for 50×50 image, 2500 is reduced to −193 which reduces complexity, improves training and inferencing time.

For images involving person, face etc., this pre-process steps automatically maintains anonymity and privacy is protected as only the contour is considered instead of entire image.

FIGS. 8A, 8B, 8C and 8D illustrate an example parallelized contour detection mechanism in accordance with an embodiment of the present disclosure.

FIG. 8A pertains to a binary image dimensioned, for example as 50×50 (or 28×28 or 32×32 or other-dimension) image for detection of boundary of the object is received and subjected to undergo pre-processing as the primary image to output the secondary image (the binary image).

Figure 8B:
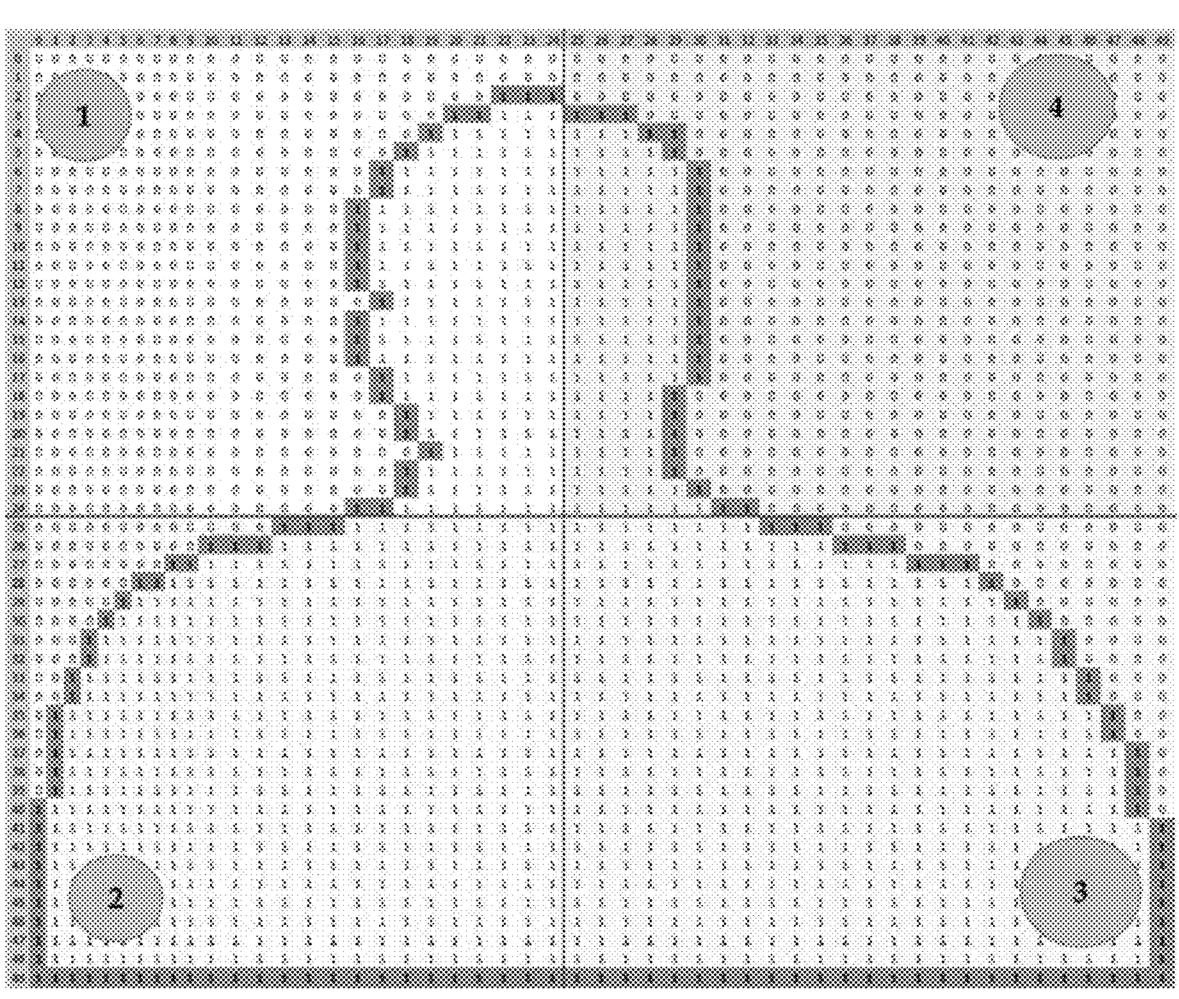

FIG. 8B pertains to splitting the secondary image into a plurality of image segments by an image splitter and indexing each segment of the plurality of segments in clockwise or anticlockwise order. In an example, the original binary image may be split into 4 (or 8 or 16) sub-images. The secondary image may be split into 4 quadrant image segment. In the present example, the images have been numbered anticlockwise, for example, a first quadrant image segment is numbered 4, second quadrant image segment is numbered 1, third quadrant image segment is numbered 2, and forth quadrant image segment is numbered 3 as shown in FIG. 8B, but is not limited thereto. Within each image segment, the edge rows or columns within each image segment may be marked. The edge row and the edge column indicate a periphery formed at each segment due to splitting of the secondary image into the plurality of segments.

Figure 8C:
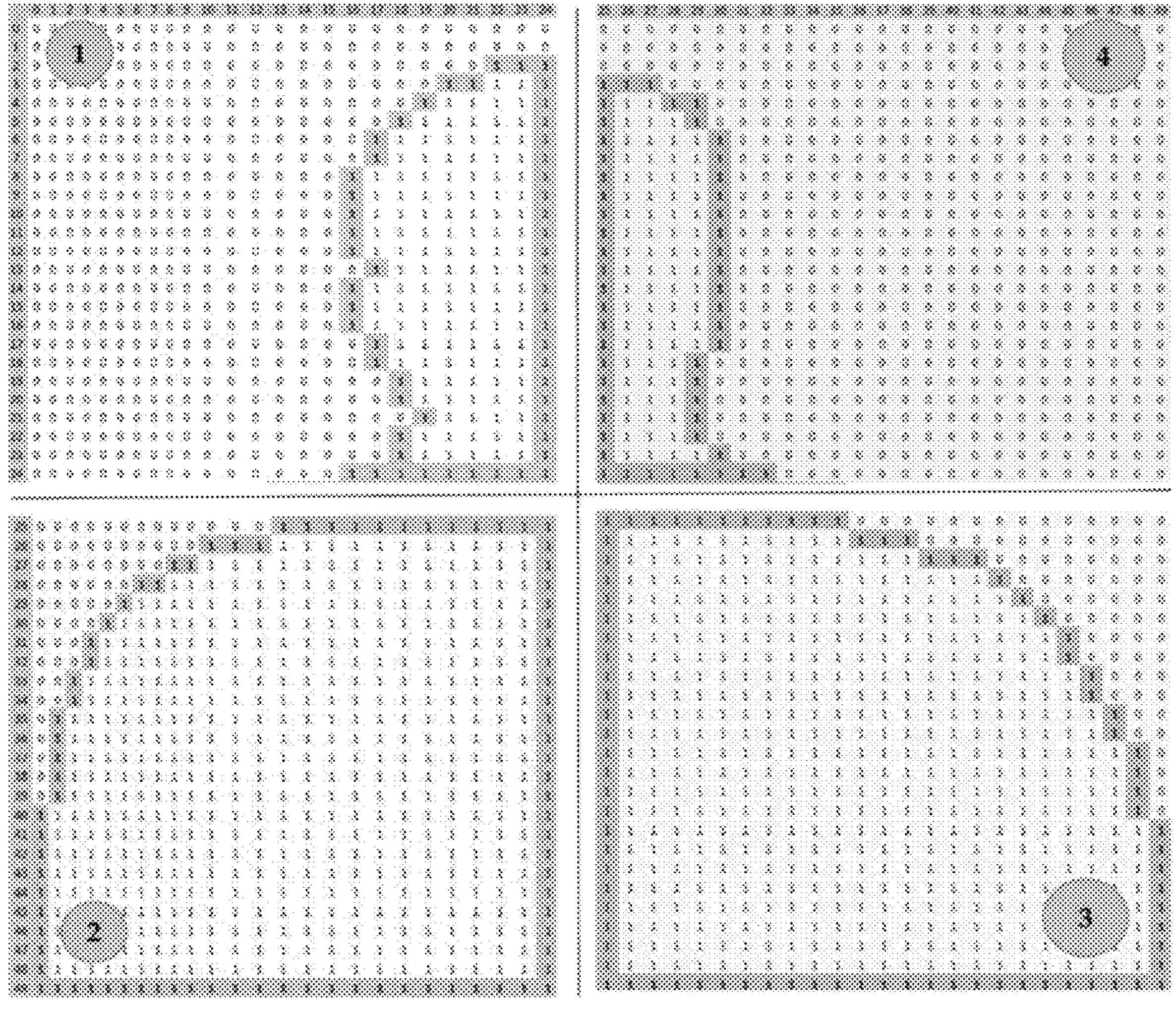

FIG. 8C pertains to detecting in parallel the boundary of the object within each of the plurality of segments based on subjecting each of the plurality of segments to the steps 104 to 110 of FIG. 1 for detecting the boundary of the object in parallel for each of the plurality of segments. Accordingly, the contour detection may be performed in parallel for each image segment.

Figure 8D:
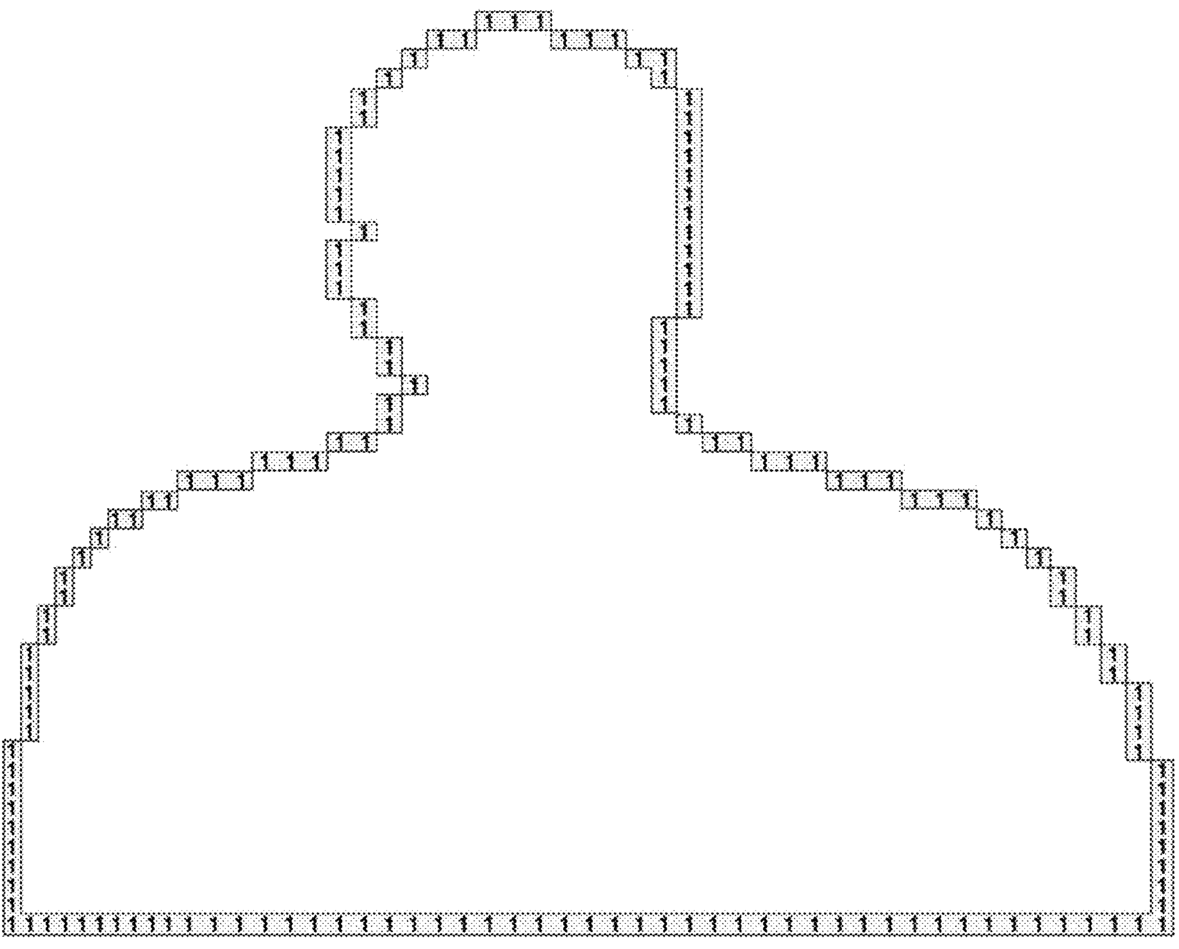

FIG. 8D pertains to a final contour detection wherein the contours of the 4 image segments as detected in FIG. 8C are stitched together. For such purposes, at least one joining point may be identified upon each of the edge row and the edge column of each of the plurality of segments, each of the joining point representing a boundary pixel upon the detected boundary. The plurality of image segments may be combined through an image combiner through the identified one or more joining points in accordance with an index of the segment to generate a unified boundary representation from the detected boundary within each of the plurality of segments. Such stitching process has been further elaborated in forthcoming FIG. 10.

Figure 9B:
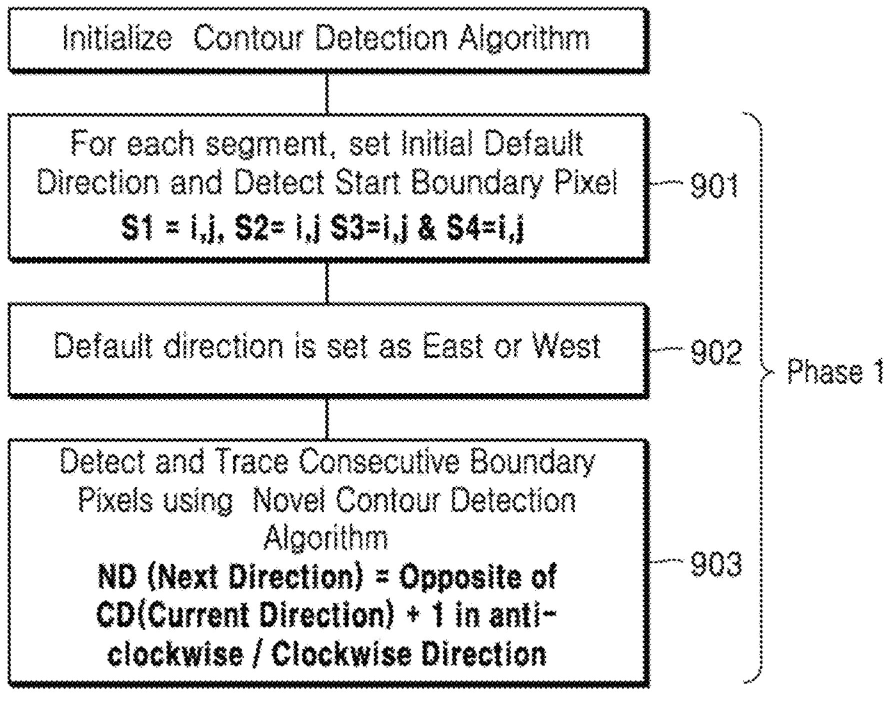
Figure 9C:
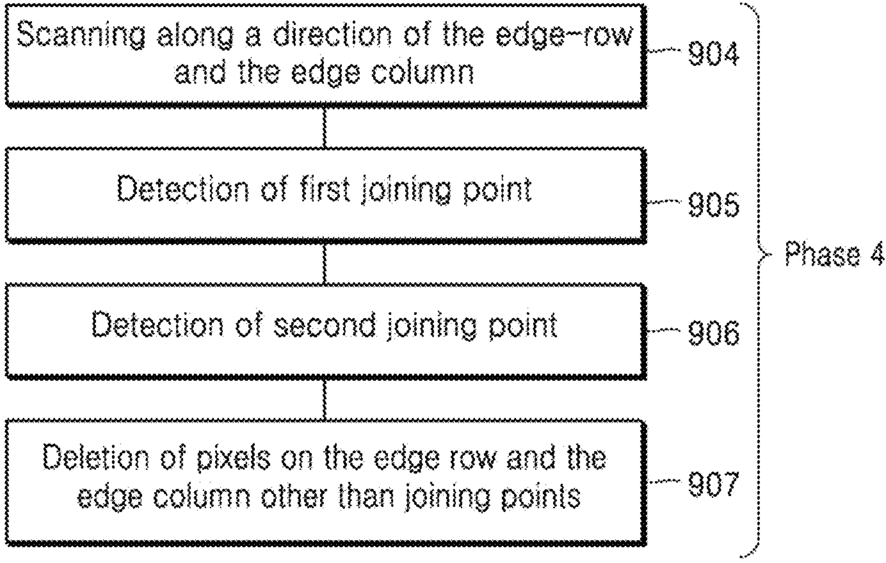

FIGS. 9A, 9B, and 9C illustrate an example parallelized contour detection mechanism in accordance with an embodiment of the present disclosure.

Out of the phases 1-4 relevant in context of FIG. 9A, Phase 1 to Phase 3 of parallelized contour detection corresponds to respective phases referred in FIG. 4B with relevant variations. FIG. 9C further refers Phase 4 of parallelized contour detection.

Phase 1 pertains to initialization and may include forthcoming steps 901, 902 and 903. As a precursor to these forthcoming steps, the secondary image as received for detection of boundary of the object undergoes splitting into a plurality of image segments. Each image segment may be indexed in clockwise or anticlockwise order. A first quadrant image may be indexed first, but is not limited thereto. For example, a second quadrant image may be indexed first as shown in FIG. 9A. In an example, the original binary image may be split into 4 (or 8 or 16) sub-images.

At Step 901, the four image segments to be processed in parallel for contour detection may be received. The starting point or start boundary pixel S may be identified for contour detection, depending on the position of the segment of the image in anti-clockwise direction. For each segment, an initial default direction may be set and a start boundary pixel may be detected. More specifically, a vector of four starting points and four default directions (West-East) or (East-West) may be set as shown in FIG. 9A.

Mat (row, col) as starting position (e.g. the start boundary pixel) may be represented as:

S1=i,j, S2=i,j S3=i,j & S4=i,j, as shown in FIG. 9A.

As a part of Initial Boundary Pixel Detection, direction A as referred in FIG. 9A refers to a scanning direction from West to East (east scan direction) and thereafter from top to bottom for image segments 1 and 2. Direction B as referred in FIG. 9A refers a scanning direction from East to West (west scan direction) and thereafter from bottom to top.

At step 902, the default direction may be set as East for left two segments (e.g. image segments 1 and 2) and a default direction may be set as West for right two segments.

At step 903, 8 neighborhood pixels around starting point S may be scanned in anti-clock wise direction from opposite direction +1 of current direction. The same is performed in parallel for each of the image segments.

In FIG. 9A, '0' circled pixels refer to start boundary points of each parallelized part of contour detection. The detection and processing of A, B and O are unique to each parallelized portion of the image and depend on the position and direction (e.g. anti-clockwise direction of parallelized processing) and stitching of traced contour.

Further, subsequent to Phase 1 (steps 901-903) depicted in FIG. 9B, the Phase 2 may be executed as a part of parallelized contour detection of FIG. 9A and as part of step 806 of FIG. 8. Phase 2 in FIG. 9B corresponds to Phase 2 as depicted in FIG. 4B. However, here the trace end condition in Phase 2 of FIG. 9B corresponds to determining terminating condition determined for each image segment uniquely which is dependent on the position of the image segment in the direction of processing (Anti-Clockwise or clockwise). The contour detection may be terminated either if the current boundary pixel CP reaches the starting boundary pixel S or a TraceEnd condition is set as true based on the boundaries of the segment of the image.

Further subsequent to Phase 2 depicted in FIG. 9B, the Phase 3 may be executed as a part of parallelized contour detection of FIG. 9A and as a part of step 806 of FIG. 8. Phase 3 in FIG. 9B corresponds to Phase 3 as depicted in FIG. 4B. Phase 3 denotes generating a dataset based on boundary detected in Phase 2. More specifically, as a part of Phase 3, optimized feature points are generated as the dataset, for each of image segments 1 to 4 based on boundary detection.

FIG. 9C illustrates Phase 4 that is performed subsequent to Phase 3 depicted in FIG. 9B. The Phase 4 may be executed as a part of parallelized contour detection of FIG. 9A and as a part of step 808 of FIG. 8. Phase 4 as referred in FIG. 9C depicts finding of joining point(s) within contours detected in parallel for each segment at Phase 3 of FIG. 9B. These points located in FIG. 9C for each segment may be further bonded together (as later depicted in FIG. 10) for stitching contours for each segment. Specifically, the individually detected contours in each image segment in Phase 3 are combined into one whole-contour. In addition, the direction of segmentation into the image segments (Anti-clockwise or clockwise) may be considered for combining the contours into the single final contour.

Specifically, with respect to FIG. 4 and as shown in FIG. 9A, image segments 2 and 4 may be neighboring image segments of image segment 1. Similarly, image segments 2 and 4 may be neighboring image segments of image segment 3. Considering image segment 1, Row 13 and column 13 are Edge Row and Edge Column respectively. Row 14(0) of Image segment 2 and Column 14 (0) of image segment 4 are Adjacent Edge Row and Edge Columns of image segment 1.

Referring back FIG. 9C, the finding of stitch points (Start and End) boundary pixel of the edge row or column of Phase 4 in FIG. 9A may be categorized in a sequence of following sub-steps:

At step 904, the first segment (e.g. Image segment 1) in FIG. 9A is scanned along a direction of the edge-row and the edge column. More specifically and in an example, scanning may be performed from left to right and bottom to top (anti-clockwise) direction of the edge rows and column respectively. (e.g. Row 24 and Column 24 of image segment 1 as depicted in FIG. 9A).

At step 905, a first joining point in the first segment in FIG. 9A may be detected at a first location within the edge row defined by meeting of the detected boundary with the edge row, and the presence of a predefined number of boundary pixels in the plurality of segments adjacent to the first segment. The first joining point or the start boundary pixel may be detected where the contour enters the edge row and may have 8 neighborhood boundary pixels in the adjacent image segment (e.g. Image segment 2 and Image Segment 4 are adjacent Image Segments of Image segment 1).

At step 906, a second joining point may be detected at a second location within the edge column defined by meeting of the detected boundary with the edge column, and presence of the predefined number of boundary pixels in the plurality of segments adjacent to the first segment. More specifically, the second joining point may be located based on scanning edge column where the contour leaves the edge column and has 8 neighborhood boundary pixels in the adjacent image segment.

At step 907, a plurality of boundary pixels other than the first and second joining points on the edge row and the edge column of the first segment may be ignored or deleted. For example, if there are other boundary pixels than the first and second joining pixels on edge row and edge column, then the same are ignored or removed. For example, at image segment 1 on column 13, rows 9, 8, 7, 6 are ignored.

Steps 904 to 907 may be repeated for consecutive image segments 2, 3, 4 of FIG. 9A in anti-clockwise direction. Accordingly, the stitch process of Phase 4 may be completed by copying the boundary trace of each image segment into full-image matrix in sequence in anti-clockwise direction.

FIG. 10A illustrates a process of finding stitch-points (first and second) Boundary pixel of Edge Row or Column for each segment corresponding to Phase 4 in FIG. 9C and stitching all the segments based on the found stitch-points, in accordance with the step 808 of FIG. 8 and In other words, FIG. 10A represents operation of an image combiner and a further operation upon completion of the iteratively performed execution of steps 904 till 907.

'O' circled pixels without 'X' indicate that corresponding pixels are detected start-end Markers (e.g. first and second joining or stitch points) for stitching processing of each image segment. First and second joining points may be detected by simultaneously scanning edge row or edge column of adjacent-image segments.

Pixels pointed by circled 'X' are additionally detected boundary pixels during parallel contour detection in each image segment. Such additional points (pixels) may be ignored or deleted during contour-stitching process to finally obtain overall stitched resultant boundary-points.

As shown in FIG. 10B, a final detected boundary are detected based on parallel contour detection as an outcome of Step 808 of FIG. 8 or Phase 4 as referred in FIG. 9C. Such parallelized contour detection of each image segment improves a boundary detection time by 4× to 8× for 4 image segments.

Figure 11:
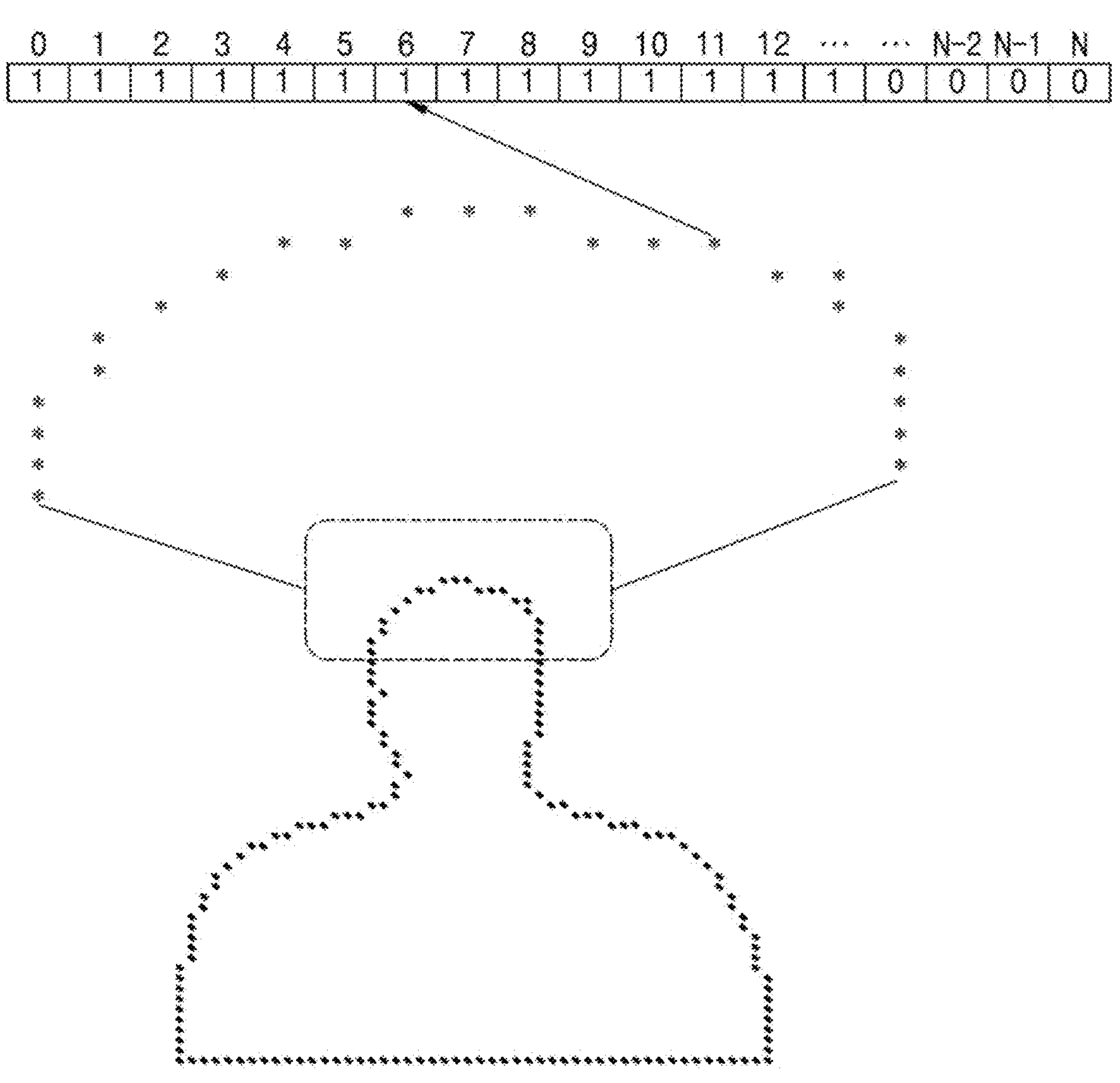
FIG. 11 illustrates an example dataset generated with a reduced input feature set for machine learning, in accordance with an embodiment of the present disclosure.

FIG. 11 illustrates an example dataset generated with a reduced input feature set for machine learning, in accordance with an embodiment of the present disclosure.

In matrix as shown, the boundary detected pixel marked by 1. The operation may be depicted in respect of various stages as Stage 1 to Stage 3.

As per Stage 1, a maximum boundary pixel count may be determined. Specifically, a count of plurality of boundary pixels constituted by the start boundary pixel, the next boundary pixel and the further next boundary pixels may be determined. During boundary detection, maximum boundary pixel count (MBPC) may be computed across images for which boundary is detected to be considered in the dataset. For example, MBPC may be set as 266.

Compute Round(SQRT(MBPC))+1=16+1=17

Set 1×17 is the row vector size for each image in dataset. RVS (Row Vector Size)=1×17.

As per Stage 2, a single row feature vector may be generated based on plurality of boundary pixels; for at least one image. Specifically, a boundary pixel matrix may be linearized into 1×N row vector. The scanning may be pursued from Left to Right and Top to Bottom. Each boundary detected pixel may be mapped into a linearized dataset to reduce input feature set. Said steps are repeated until all boundary pixel are linearized into a 1×N row vector.

At stage 3, a combined dataset is generated, wherein said combined data set may include multiple feature-vector rows for one or more images based on the single row feature vector associated with each of the one or more images. Accordingly, reduced new dataset is generated.

Stage 2 is repeated for all images M to construct 1×N row vector per image in the dataset where N=RVS, New Generated Dataset is M×N.

Figure 12:
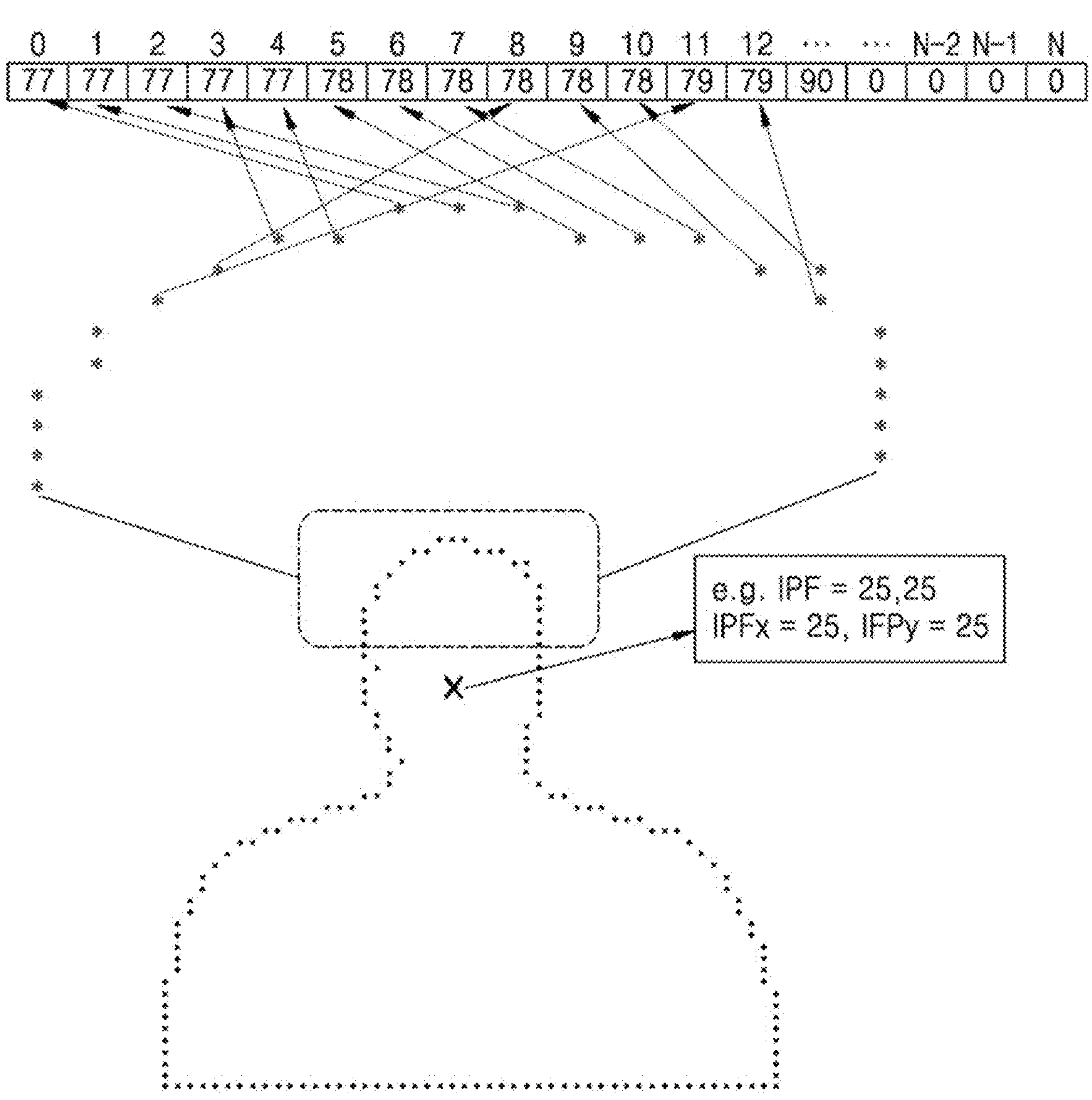
FIG. 12 illustrates an example metadata input and dataset generated with reduced input feature set for Machine Learning, in accordance with an embodiment of the present disclosure.

FIG. 12 illustrates a metadata input-based optimization for dataset generation with reduced input feature set for Machine Learning based on Boundary Detection. More specifically, FIG. 12 refers an embodiment of FIG. 11 for generation of single row vector based on a relative position information of the plurality of boundary pixels. The relative position information may be considered with respect to a focal point input pixel as metadata input to indicate input features for classification or prediction through a machine learning or deep learning criteria.

Specifically, FIG. 12 refers a further optimization of FIG. 11 for better accuracy. In Stage2, instead of filling 1 for each detected boundary pixel, which results in loss of important position information of the boundary pixel, a modification is made. Specifically, stage 2 is modified to fill the detected boundary pixel information as follows.

Stage 1 of FIG. 12 may be equivalent to stage 1 of FIG. 11.

Stage 2 may relate to optimizing Linearize Boundary Pixel Matrix into 1×N row vector and may include following steps:

a) Scan Left to Right and Top to Bottom
b) Map each Boundary Detected pixel into a linearized dataset to reduce input feature set. Using Metadata input information as follows.
c) Metadata Input: Image Focal Point (IFP=25,25) for a 50×50 image (Head Region). IFPx=25 and IPFy=25.
d) Calculate distance of each pixel from focal point as
e) Dist=SQRT((IFPx−i)*(IPFx−i)+((IFPy−j)*(IFPy−j))
f) BPV=100−Round(Dist,4), where BPV is the computed Boundary Pixel Value. This captures relative position information of boundary pixel w.r.t given Focal Point input metadata which improves accuracy.

The aforesaid step 2 is repeated until all boundary pixel are linearized into a 1×N row vector.

Stage 3 of FIG. 12 may be equivalent to stage 3 of FIG. 11.

Figure 13A:
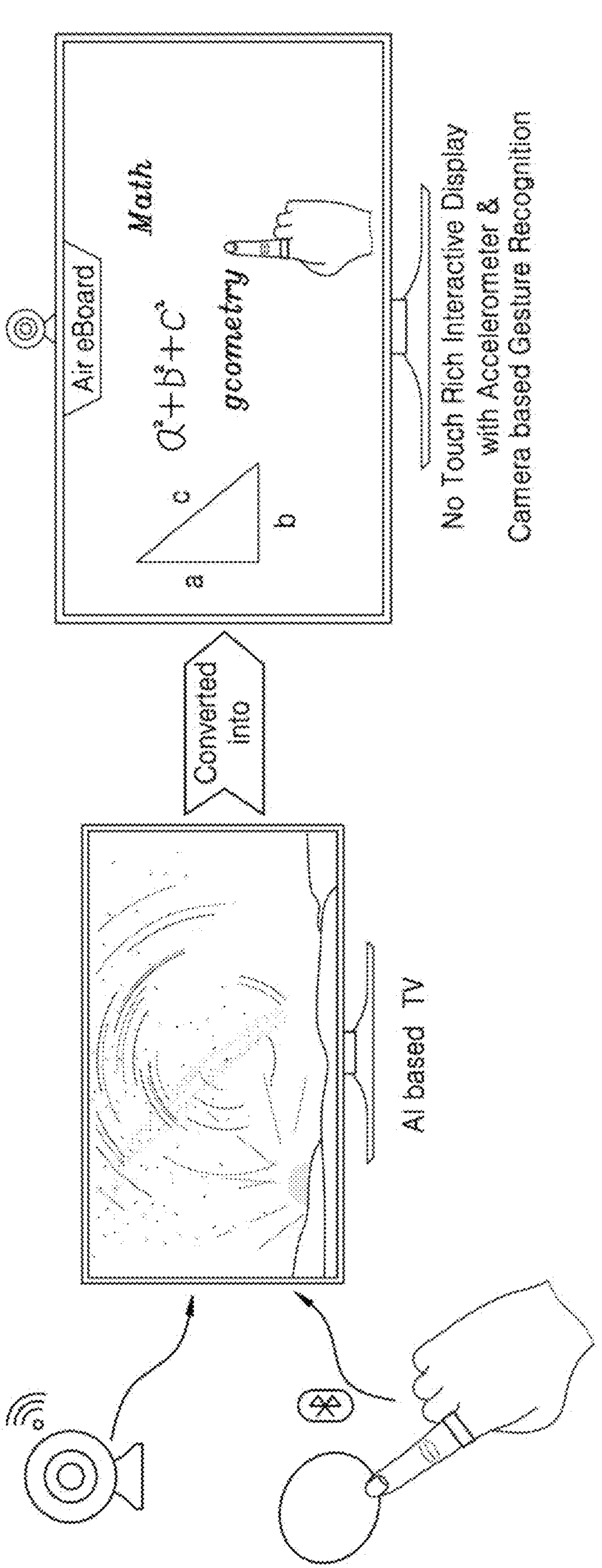

FIG. 13A illustrates a scenario of contour detection for purposes of realizing an air e-board and accordingly refers gesture recognition for enabling no touch-based interaction for a Smart TV. A user may use rich interactivity like in Smart White Board used to teach kids at home. The rich interactivity may be enabled through accelerometer and camera-based gesture recognition. Input streams may be processed to recognize gestures based on gesture profiles that are activated and translate gestures into corresponding actions like in Air eBoard drawing diagrams and text. Intelligence is of ML model trained using real-time ML algorithm and inferencing of gestures translated into intelligent actions in Air eBoard scenarios. Gesture detection will be faster because of pre-processing and feature detection, reduced input features based on the Contour Detection.

FIG. 13B illustrates a scenario of character recognition based on contour detection. There may be many scenarios where-in characters need to be recognized for automation like on medicine bottles—expiry date, reading number plate, street sign etc. Character Recognition based on present subject matter's contour detection will be faster because of pre-processing and feature detection, reduced input features.

Figure 14A:
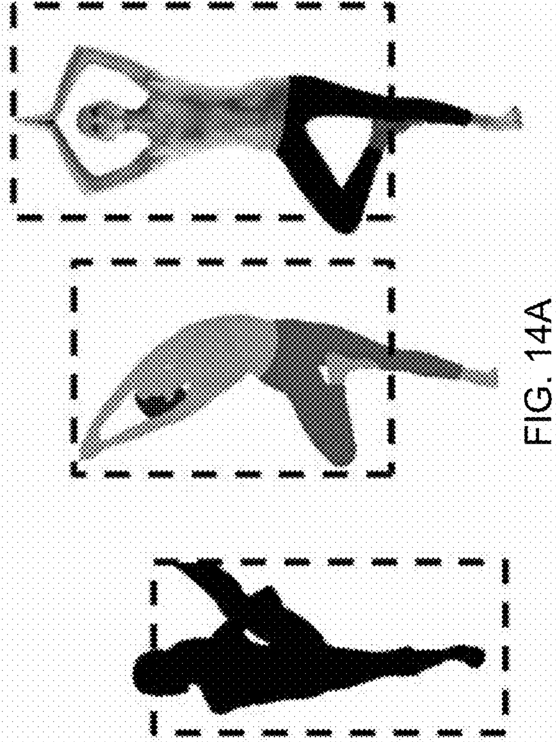
Figure 14B:
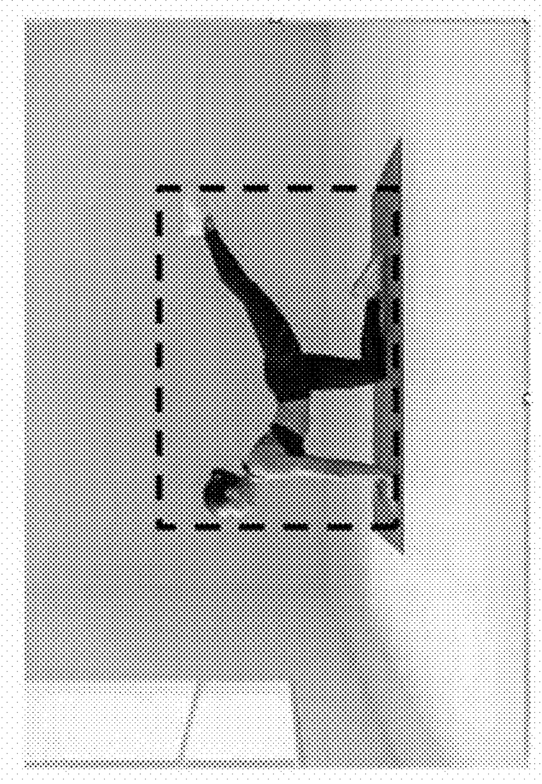
Figure 14C:
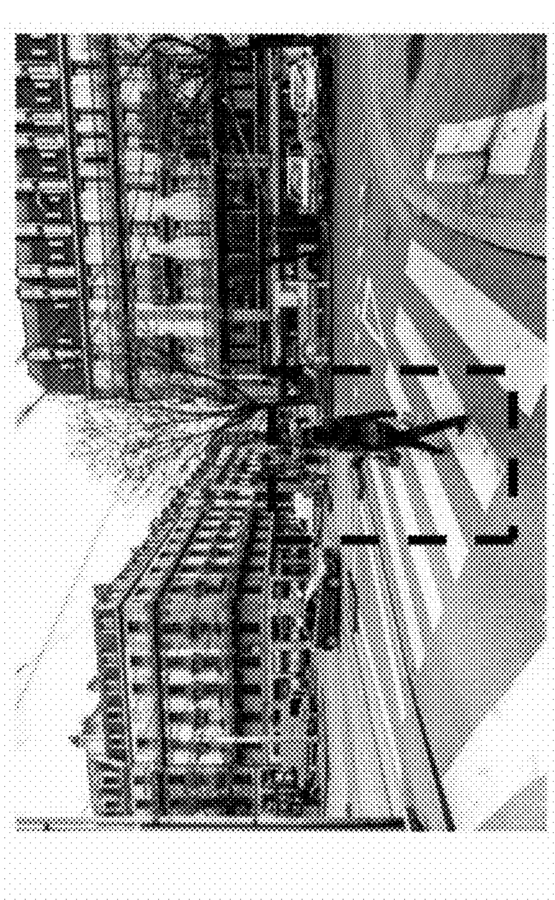
Figure 14D:
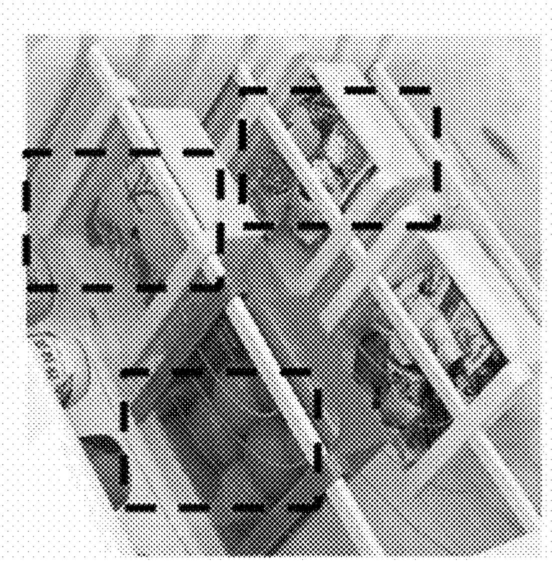

FIGS. 14A and 14B illustrate a scenario of Yoga training based on contour detection. If a user stands in front of the Smart TV and performs a fitness action (yoga), the yoga app or yoga mode is triggered. Further the yoga actions performed by the user may be recognized by the Smart Yoga app. A current aasana (yoga routine) display is performed. Detailed steps to do the aasana (yoga routine) and next step as and when each step is completed are rendered. Gesture detection will be faster because of pre-processing and feature detection, reduced input features based on new novel Contour Detection Algorithm FIG. 14C illustrates a scenario of Real-time Object Detection based on contour detection. The real-time object detection covers street crossing scenario or detection of objects in a streaming video viewed by user on Smart TV to provide suitable recommendations to the user. Real-time object detection will be faster because of pre-processing and feature detection, reduced input features based on the Contour Detection technique. FIG. 14D further illustrates a scenario of Smart Refrigerator based on contour detection. The detection helps in detecting items in Refrigerator to be replenished. Real-time object detection will be faster because of pre-processing and feature detection, reduced input features based on the Contour Detection technique.

Figure 15B:
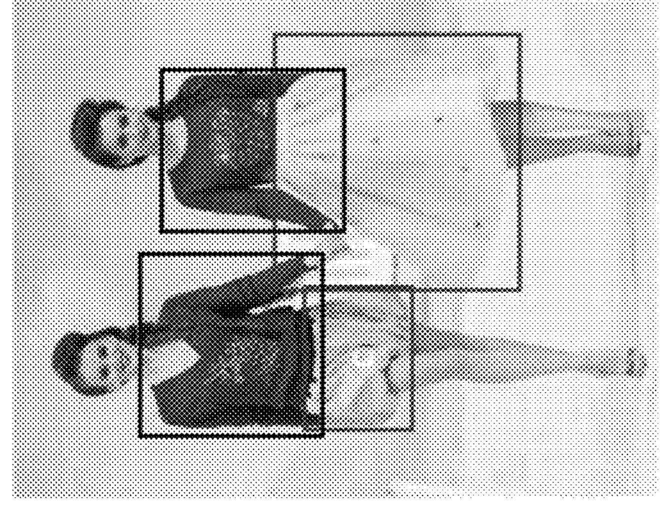
Figure 15B:
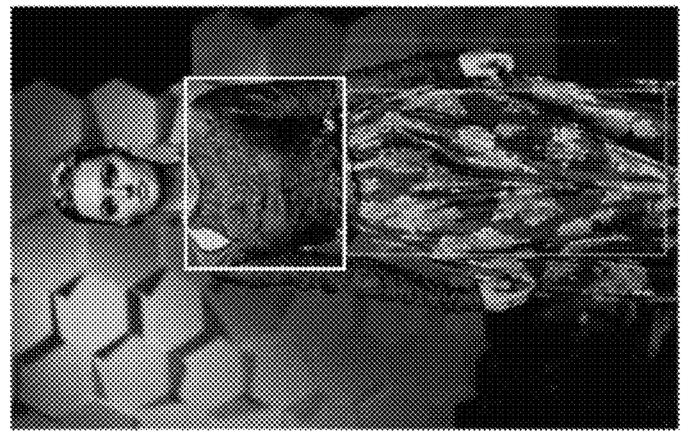
Figure 15A:
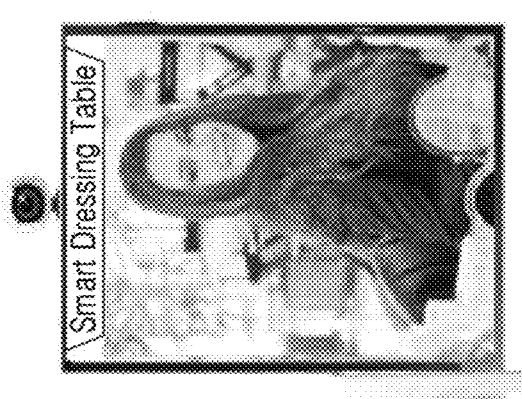

FIG. 15A illustrates a scenario of Tilt-able Display as Smart Dressing device for facilitating 'Smart Dressing'. In operation, the user comes in front of the horizontally positioned TV, the display of the TV is tilted to double up as a Smart Dressing device. The Smart Mirror mode is activated by recognizing the person and hair grooming action. In an example, recommendations may be displayed on the "Smart Dressing panel" on various facial and hair products or dress or jewelry etc. More specifically, person presence detection, gesture detection and object detection are based on image-based multi-classifier. The same is enhanced and faster due to reduced input feature set at least based on the contour detection mechanism described herein.

FIG. 15B illustrates a further scenario of real-time object detection. There are many applications where-in real-time object detection like in case of detection of apparel during any public event such a ramp walk. A 'Smart Fashion'-based module detects apparel as a part of real-time object detection. The real-time object detection may be faster because of pre-processing and feature detection, reduced input features based on the contour detection mechanism described herein.

Figure 16:
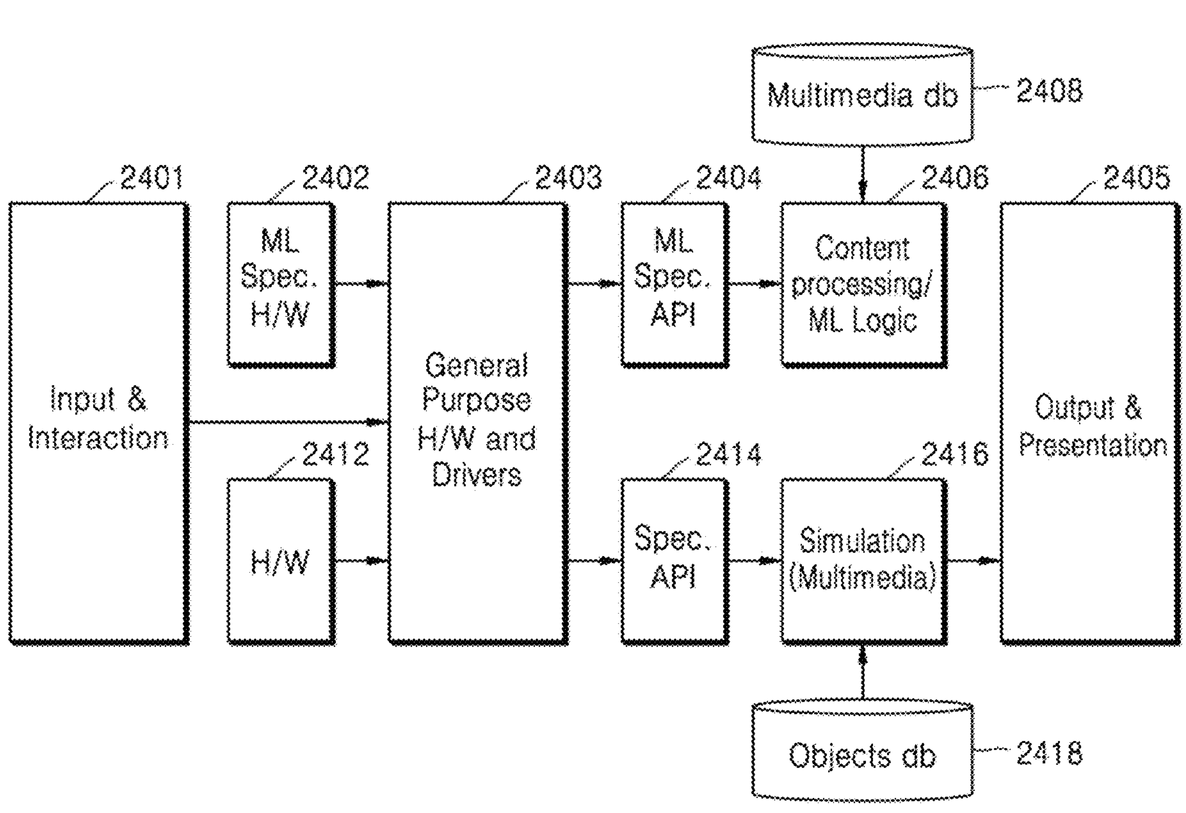
FIG. 16 illustrates a block diagram of an architecture in accordance with an embodiment of the present disclosure.

FIG. 16 illustrates a representative architecture 2400 to provide tools and development environment described herein for a technical-realization of the implementation server, controller and nodes in the mesh network through a computing device 300 of FIG. 3. FIGS. 15A-15B are merely a non-limiting examples, and it will be appreciated that many other architectures may be implemented to facilitate the functionality described herein. The architecture may be executing on hardware such as a computing machine 2400 of FIG. 16 that may include, among other things, processors, memory, and various application-specific hardware components.

The architecture 2400 may include an operating-system, libraries, frameworks or middleware. The operating system may manage hardware resources and provide common services. The operating system may include, for example, a kernel, services, and drivers defining a hardware interface layer. The drivers may be responsible for controlling or interfacing with the underlying hardware. For instance, the drivers may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

A hardware interface layer includes libraries which may include system libraries such as file-system (e.g., C standard library) that may provide functions such as memory allocation functions, string manipulation functions, mathematic functions, and the like. In addition, the libraries may include API libraries such as audio-visual media libraries (e.g., multimedia data libraries to support presentation and manipulation of various media format such as MPEG4, H.264, MP3, AAC, AMR, JPG, PNG), database libraries (e.g., SQLite that may provide various relational database functions), web libraries (e.g. WebKit that may provide web browsing functionality), and the like.

A middleware may provide a higher-level common infrastructure such as various graphic user interface (GUI) functions, high-level resource management, high-level location services, and so forth. The middleware may provide a broad spectrum of other APIs that may be utilized by the applications or other software components/modules, some of which may be specific to a particular operating system or platform.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of ASIC (Application-Specific Integrated Circuit) chip, FPGAs (Field-Programmable Gate Arrays), and programmable-logic device, which have been known or are to be developed.

Further, the architecture 2400 depicts an aggregation of audio/video processing device-based mechanisms and ML/NLP-based mechanism in accordance with an embodiment of the disclosure. A user-interface defined as input and interaction 2401 refers to overall input. It may include one or more of the following—touch screen, microphone, camera etc. A first hardware module 2402 depicts specialized hardware for ML/NLP-based mechanisms. In an example, the first hardware module 2402 may include one or more of neural processors, FPGA, DSP, GPU etc.

A second hardware module 2412 depicts specialized hardware for executing the data splitting and transfer. ML/NLP-based frameworks and APIs 2404 correspond to the hardware interface layer for executing the ML/NLP logic 2406 based on the underlying hardware. In an example, the frameworks may be one or more or the following—Tensorflow, Cafe, NLTK, GenSim, ARM Computer etc. Simulation frameworks and APIs 2414 may include one or more of—Audio Core, Audio Kit, Unity, Unreal etc.

A database 2408 depicts a pre-trained database. The database 2408 may be remotely accessible through cloud by the ML/NLP logic 2406. In other example, the database 2408 may partly reside on cloud and partly on-device based on usage statistics.

Another database 2418 refers the memory. The database 2418 may be remotely accessible through cloud. In other example, the database 2418 may partly reside on the cloud and partly on-device based on usage statistics.

A rendering module 2405 is provided for rendering audio output and trigger further utility operations. The rendering module 2405 may be manifested as a display cum touch screen, monitor, speaker, projection screen, etc.

Figure 17:
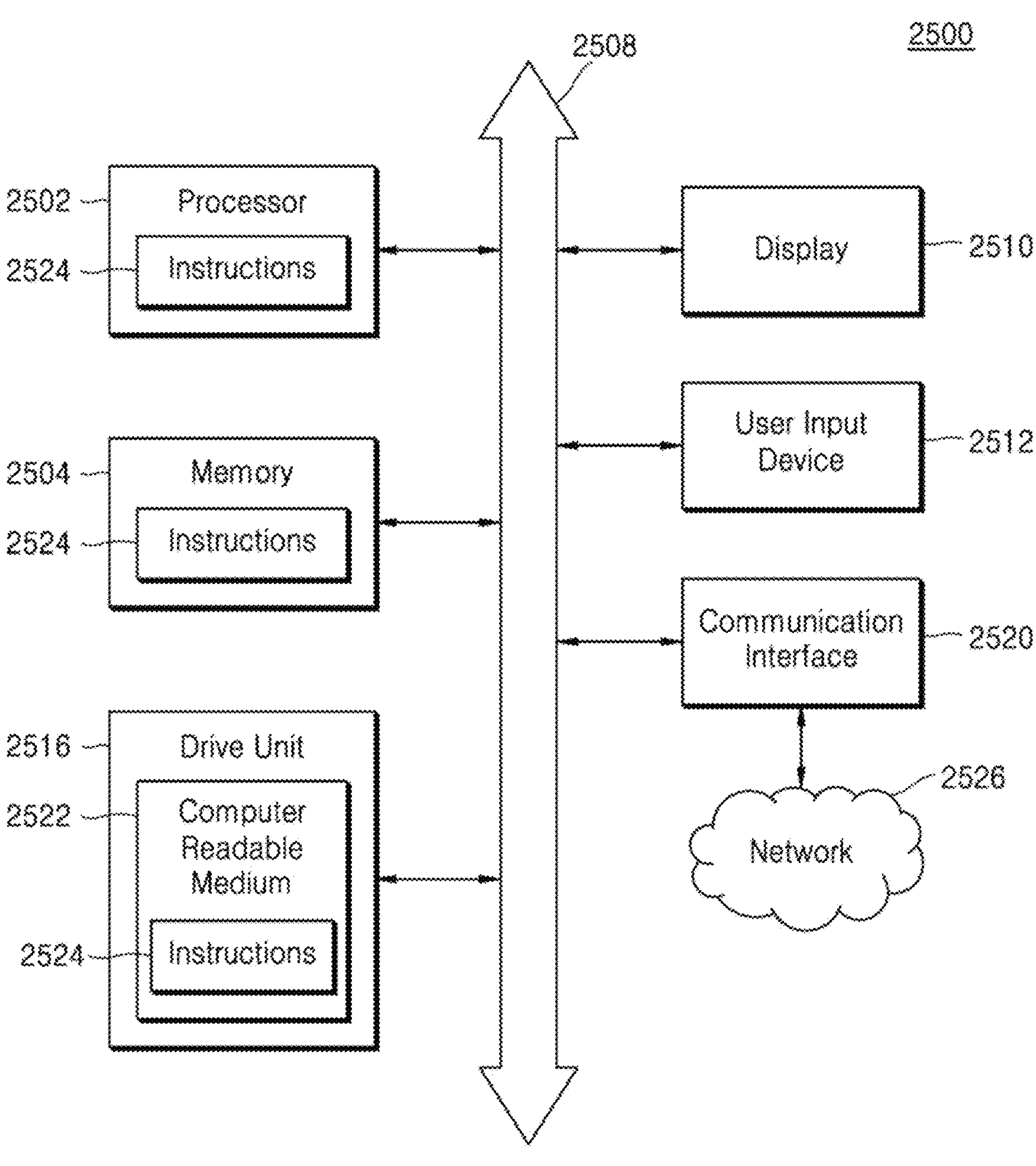
FIG. 17 illustrates a block diagram of an electronic device in accordance with an embodiment of the present disclosure.

A general-purpose hardware and driver module 2403 corresponds to the computing device 2500 as referred in FIG. 17 and instantiates drivers for the general purpose hardware units as well as the application-specific units (2402, 2412).

In an example, the ML mechanism underlying the present architecture 2400 may be remotely accessible and cloud-based, thereby being remotely accessible through a network connection. An audio/video processing device may be configured for remotely accessing the NLP/ML modules and simulation modules may include skeleton elements such as a microphone, a camera a screen/monitor, a speaker etc.

Further, at least one of the plurality of modules of mesh network may be implemented through AI based on an ML/NLP logic 2406. A function associated with AI may be performed through the non-volatile memory, the volatile memory, and the processor constituting the first hardware module 2402 e.g. specialized hardware for ML/NLP-based mechanisms. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The aforesaid processors collectively correspond to the processor 2502 of FIG. 17.

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning logic/technique to a plurality of learning data, a predefined operating rule or AI model of the desired characteristic is made. "Obtained by training" means that a predefined operation rule or artificial intelligence model configured to perform a desired feature (or purpose) is obtained by training a basic artificial intelligence model with multiple pieces of training data by a training technique. The learning may be performed in a device (e.g. the architecture 2400 or the device 2500) itself in which AI according to an embodiment is performed, and/or may be implemented through a separate server/system."

The AI model may consist of a plurality of neural network layers. Each layer may have a plurality of weight values, and performs a neural network layer operation through calculation between a result of computation of a previous layer and an operation of a plurality of weights. Examples of neural networks may include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The ML/NLP logic 2406 is a method for training a predetermined target device (for example, a robot) using a plurality of learning data to cause, allow, or control the target device to make a determination or prediction. Examples of learning techniques may include, but are not limited to, supervised learning, unsupervised learning, semi-supervised learning, or reinforcement learning.

FIG. 17 shows yet another exemplary implementation in accordance with the embodiment of the disclosure, and yet another typical hardware configuration of the system 2400 in the form of a computer system 2500. The computer system 2500 may include a set of instructions that may be executed to cause the computer system 2500 to perform any one or more of the methods disclosed. The computer system 2500 may operate as a standalone device or may be connected, e.g., using a network, to other computer systems or peripheral devices.

In a networked deployment, the computer system 2500 may operate in the capacity of a server or as a client user computer in a server-client user network environment, or as a peer computer system in a peer-to-peer (or distributed) network environment. The computer system 2500 may also be implemented as or incorporated across various devices, such as a personal computer (PC), a tablet PC, a personal digital assistant (PDA), a mobile device, a palmtop computer, a laptop computer, a desktop computer, a communications device, a wireless telephone, a land-line telephone, a web appliance, a network router, switch or bridge, or any other machine capable of executing a set of instructions (sequential or otherwise) that specify actions to be taken by that machine. Further, while a single computer system 2500 is illustrated, the term "system" shall also be taken to include any collection of systems or sub-systems that individually or jointly execute a set, or multiple sets, of instructions to perform one or more computer functions.

The computer system 2500 may include a processor 2502 e.g., a central processing unit (CPU), a graphics processing unit (GPU), or both. The processor 2502 may be a component in a variety of systems. For example, the processor 2502 may be part of a standard personal computer or a workstation. The processor 2502 may be one or more general processors, digital signal processors, application-specific integrated circuits, field-programmable gate arrays, servers, networks, digital circuits, analog circuits, combinations thereof, or other now known or later developed devices for analyzing and processing data. The processor 2502 may implement a software program, such as code generated manually (e.g., programmed).

The computer system 2500 may include a memory 2504, such as a memory 2504 that may communicate via a bus 2508. The memory 2504 may include, but is not limited to computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, memory 2504 may include a cache or random access memory for the processor 2502. In alternative examples, the memory 2504 is separate from the processor 2502, such as a cache memory of a processor, the system memory, or other memory. The memory 2504 may be an external storage device or database for storing data. The memory 2504 is operable to store instructions executable by the processor 2502. The functions, acts or tasks illustrated in the figures or described may be performed by the programmed processor 2502 for executing the instructions stored in the memory 2504. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system 2500 may or may not further include a display unit 2510, such as a liquid crystal display (LCD), an organic light-emitting diode (OLED), a flat panel display, a solid-state display, a cathode ray tube (CRT), a projector, a printer or other now known or later developed display device for outputting determined information. The display 2510 may act as an interface for the user to see the functioning of the processor 2502, or specifically as an interface with the software stored in the memory 2504 or the drive unit 2516.

Additionally, the computer system 2500 may include an input device 2512 configured to allow a user to interact with any of the components of system 2500. The computer system 2500 may also include a disk or optical drive unit 2516. The disk drive unit 2516 may include a computer-readable medium 2522 in which one or more sets of instructions 2524, e.g. software, may be embedded. Further, the instructions 2524 may embody one or more of the methods or logic as described. In a particular example, the instructions 2524 may reside completely, or at least partially, within the memory 2504 or within the processor 2502 during execution by the computer system 2500.

The present disclosure contemplates a computer-readable medium that includes instructions 2524 or receives and executes instructions 2524 responsive to a propagated signal so that a device connected to a network 2526 may communicate voice, video, audio, images, or any other data over the network 2526. Further, the instructions 2524 may be transmitted or received over the network 2526 via a communication port or interface 2520 or using a bus 2508. The communication port or interface 2520 may be a part of the processor 2502 or maybe a separate component. The communication port 2520 may be created in software or maybe a physical connection in hardware. The communication port 2520 may be configured to connect with a network 2526, external media, the display 2510, or any other components in system 2500, or combinations thereof. The connection with the network 2526 may be a physical connection, such as a wired Ethernet connection or may be established wirelessly as discussed later. Likewise, the additional connections with other components of the system 2500 may be physical or may be established wirelessly. The network 2526 may alternatively be directly connected to the bus 2508.

The network 2526 may include wired networks, wireless networks, Ethernet AVB networks, or combinations thereof. The wireless network may be a cellular telephone network, an 802.11, 802.16, 802.20, 802.1Q or WiMax network. Further, the network 826 may be a public network, such as the Internet, a private network, such as an intranet, or combinations thereof, and may utilize a variety of networking protocols now available or later developed including, but not limited to TCP/IP-based networking protocols. The system is not limited to operation with any particular standards and protocols. For example, standards for Internet and other packet-switched network transmissions (e.g., TCP/IP, UDP/IP, HTML, and HTTP) may be used.

While specific language has been used to describe the disclosure, any limitations arising on account of the same are not intended. As would be apparent to a person in the art, various modifications may be made to the method in order to implement aspects of the disclosure as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to the problem and any component(s) that may cause any benefit, advantage, or solution to occur or become more pronounced are not to be construed as a critical, required, or essential feature or component of any or all the claims.

What is claimed is:

1. An electronic device comprising:

a memory storing instructions; and at least one processor configured to execute the instructions to:

process an image to output a secondary image;

split the secondary image into a plurality of image segments;

scan the secondary image in a scan direction from a start pixel in each of the plurality of image segments to identify a first boundary pixel found as satisfying a boundary criteria during the scanning of the secondary image;

identify a second boundary pixel satisfying the boundary criteria by rotating the scan direction and scanning pixels in the secondary image along a circumferential direction centered on the first boundary pixel, wherein the scanning of the pixels starts from a pixel that is adjacent to the first boundary pixel, located in the rotated scan direction and adjacent to a direction opposite to the scan direction;

identify one or more next boundary pixels until a respective contour of an object is obtained in each of the plurality of image segments; and obtain a complete contour of the object in the secondary image based on the respective contours obtained in the plurality of image segments, wherein scan directions used for at least two different image segments are opposite to each other.

2. The electronic device of claim 1, wherein each pixel of the secondary image has a zero color value or non-zero color value, and the boundary criteria is satisfied when a corresponding pixel has the non-zero color value.

3. The electronic device of claim 1, wherein the scan direction corresponds to one or more of a west scan direction, an east scan direction, a north scan direction, or a south scan direction.

4. The electronic device of claim 1, wherein the start pixel is located at a middle of the secondary image.

5. The electronic device of claim 1, wherein the rotated scan direction is one or more of a west scan direction, an east scan direction, a north scan direction, a south scan direction, a north-west scan direction, a north-east scan direction, a south-west scan direction, or a south-east scan direction.

6. The electronic device of claim 1, wherein the start pixel is located at a left edge of the secondary image when the scan direction is an east direction, and an updated scan direction is a north-west direction or a south-west direction.

7. The electronic device of claim 1, wherein an angle between the rotated scan direction and its previous scan direction is equal to 135° or 225°.

8. The electronic device of claim 1, wherein the circumferential direction centered on the first boundary pixel is a clockwise or anticlockwise direction centered on the first boundary pixel.

9. The electronic device of claim 1, wherein the at least one processor is further configured to execute the instructions to:

scan at most 8 pixels along the circumferential direction centered on the first boundary pixel identified in the secondary image; and scan at most 7 pixels along the circumferential direction centered on the second boundary pixel identified in the secondary image.

10. The electronic device of claim 1, wherein the complete contour of the object is obtained when a last boundary pixel is identified as satisfying the boundary criteria during the scanning the secondary image.

11. The electronic device of claim 1, wherein the at least one processor is further configured to execute the instructions to:

split the secondary image to a plurality of image segments;

obtain, in parallel, a respective contour of the object in each of the plurality of image segments; and obtain the complete contour of the object in the secondary image based on the respective contour of the object in each of the plurality of image segments.

12. The electronic device of claim 11, wherein an edge boundary pixel is excluded from the complete contour of the object, and wherein the edge boundary pixel is located at an intersection edge of each of the plurality of image segments.

13. The electronic device of claim 11, wherein the plurality of image segments comprise a first quadrant image segment, a second quadrant image segment, a third quadrant image segment, and a fourth quadrant image segment, wherein a first scan direction from a first start pixel in the first quadrant image segment and a fourth scan direction from a fourth start pixel in the fourth quadrant image segment are identical, wherein a second scan direction from a second start pixel in the second quadrant image segment and a third scan direction from a third start pixel in the third quadrant image segment are identical, and wherein the first scan direction and the second scan direction are opposite.

14. A method comprising:

processing an image to output a secondary image;

splitting the secondary image into a plurality of image segments;

scanning the secondary image in a scan direction from a start pixel in each of the plurality of image segments to identify a first boundary pixel found as satisfying a boundary criteria during the scanning of the secondary image;

identifying a second boundary pixel satisfying the boundary criteria by rotating the scan direction and scanning pixels in the secondary image along a circumferential direction centered on the first boundary pixel, wherein the scanning of the pixels starts from a pixel that is adjacent to the first boundary pixel, located in the rotated scan direction and adjacent to a direction opposite to the scan direction;

identifying one or more next boundary pixels until a respective contour of an object is obtained in each of the plurality of image segments; and obtaining a complete contour of the object in the secondary image based on the respective contours obtained in the plurality of image segments, wherein scan directions used for at least two different image segments are opposite to each other.

15. A computer program product comprising a non-transitory computer-readable recording medium having recorded thereon a program executable by a computer for performing a method comprising:

processing an image to output a secondary image;

splitting the secondary image into a plurality of image segments;

scanning the secondary image in a scan direction from a start pixel in each of the plurality of image segments to identify a first boundary pixel found as satisfying a boundary criteria during the scanning of the secondary image;

identifying a second boundary pixel satisfying the boundary criteria by rotating the scan direction and scanning pixels in the secondary image along a circumferential direction centered on the first boundary pixel, wherein the scanning of the pixels starts from a pixel that is adjacent to the first boundary pixel, located in the rotated scan direction and adjacent to a direction opposite to the scan direction;

identifying one or more next boundary pixels until a respective contour of an object is obtained in each of the plurality of image segments; and obtaining a complete contour of the object in the secondary image based on the respective contours obtained in the plurality of image segments, wherein scan directions used for at least two different image segments are opposite to each other.

* * * * *